US012811825B2

(12) United States Patent
Liu et al.

(10) Patent No.: US 12,811,825 B2
(45) Date of Patent: Nov. 24, 2026

(54) CHANNEL ESTIMATION BASED ON A PRECODER INDICATION

(71) Applicant: QUALCOMM Incorporated, San Diego, CA (US)

(72) Inventors: Chih-Hao Liu, San Diego, CA (US); Jing Sun, San Diego, CA (US); Jing Jiang, San Diego, CA (US); Manish Jain, San Jose, CA (US); Jae Won Yoo, San Diego, CA (US); Somsubhra Barik, San Diego, CA (US); Morteza Soltani, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 288 days.

(21) Appl. No.: 18/609,799

(22) Filed: Mar. 19, 2024

(65) Prior Publication Data

US 2025/0300858 A1 Sep. 25, 2025

(51) Int. Cl.
*H04L 25/02* (2006.01)

(52) U.S. Cl.
CPC ................................ *H04L 25/0204* (2013.01)

(58) Field of Classification Search
CPC .... H04L 5/14; H04L 25/0204; H04L 25/0224
See application file for complete search history.

(56) References Cited

U.S. PATENT DOCUMENTS

| | | | | |
|---|---|---|---|---|
| 8,401,094 | B2 * | 3/2013 | Pan | H04L 25/0224 375/267 |
| 8,638,879 | B2 * | 1/2014 | Murakami | H04B 7/0456 375/295 |
| 9,088,323 | B2 * | 7/2015 | Park | H04W 88/02 |
| 9,655,086 | B2 * | 5/2017 | Chen | H04L 1/0033 |
| 9,755,810 | B2 * | 9/2017 | Gaal | H04L 5/0035 |
| 10,237,879 | B2 * | 3/2019 | Kim | H04B 7/022 |
| 10,856,270 | B2 * | 12/2020 | Kim | H04L 1/1819 |
| 2018/0097663 | A1 * | 4/2018 | Jiang | H04B 7/0626 |
| 2019/0222273 | A1 * | 7/2019 | Liu | H04L 5/003 |
| 2019/0261325 | A1 * | 8/2019 | Manolakos | H04L 5/0053 |
| 2020/0266943 | A1 * | 8/2020 | Tsai | H04L 5/0035 |
| 2020/0404667 | A1 * | 12/2020 | Khoshnevisan | H04L 5/0039 |
| 2021/0153164 | A1 * | 5/2021 | Takeda | H04L 1/1671 |
| 2022/0337368 | A1 * | 10/2022 | Ly | H04W 74/004 |

* cited by examiner

*Primary Examiner* — Bailor C Hsu
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, signaling indicating whether a set of physical resource block groups (PRGs) comprises a subset of PRGs that are associated with a same precoder, wherein the subset of PRGs comprises a plurality of PRGs that span contiguous frequency resources. The UE may receive, from the network node, a transmission via the set of PRGs. The UE may perform a joint channel estimation based on the subset of PRGs when the subset of PRGs are associated with the same precoder. Numerous other aspects are described.

26 Claims, 14 Drawing Sheets

CHANNEL ESTIMATION BASED ON A PRECODER INDICATION

FIELD OF THE DISCLOSURE

Aspects of the present disclosure generally relate to wireless communication and specifically relate to techniques, apparatuses, and methods for channel estimation based on a precoder indication.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

In some aspects, a method of wireless communication performed by a user equipment (UE) includes receiving, from a network node, signaling indicating whether a set of physical resource block groups (PRGs) comprises a subset of PRGs that are associated with a same precoder, wherein the subset of PRGs comprises a plurality of PRGs that span contiguous frequency resources; receiving, from the network node, a transmission via the set of PRGs; and performing a joint channel estimation based on the subset of PRGs when the subset of PRGs are associated with the same precoder.

In some aspects, a method of wireless communication performed by a network node includes transmitting, to a UE, signaling indicating whether a set of PRGs comprises a subset of PRGs that are associated with a same precoder, wherein the subset of PRGs comprises a plurality of PRGs that span contiguous frequency resources, and wherein the subset of PRGs being associated with the same precoder enables the UE to perform a joint channel estimation; and transmitting, to the UE, a transmission via the set of PRGs.

In some aspects, an apparatus for wireless communication at a UE includes one or more memories; and one or more processors, coupled to the one or more memories, configured to cause the UE to: receive, from a network node, signaling indicating whether a set of PRGs comprises a subset of PRGs that are associated with a same precoder, wherein the subset of PRGs comprises a plurality of PRGs that span contiguous frequency resources; receive, from the network node, a transmission via the set of PRGs; and perform a joint channel estimation based on the subset of PRGs when the subset of PRGs are associated with the same precoder.

In some aspects, an apparatus for wireless communication at a network node includes one or more memories; and one or more processors, coupled to the one or more memories, configured to cause the network node to: transmit, to a UE, signaling indicating whether a set of PRGs comprises a subset of PRGs that are associated with a same precoder, wherein the subset of PRGs comprises a plurality of PRGs that span contiguous frequency resources, and wherein the subset of PRGs being associated with the same precoder enables the UE to perform a joint channel estimation; and transmit, to the UE, a transmission via the set of PRGs.

In some aspects, a non-transitory computer-readable medium storing a set of instructions for wireless communication includes one or more instructions that, when executed by one or more processors of a UE, cause the UE to: receive, from a network node, signaling indicating whether a set of PRGs comprises a subset of PRGs that are associated with a same precoder, wherein the subset of PRGs comprises a plurality of PRGs that span contiguous frequency resources; receive, from the network node, a transmission via the set of PRGs; and perform a joint channel estimation based on the subset of PRGs when the subset of PRGs are associated with the same precoder.

In some aspects, a non-transitory computer-readable medium storing a set of instructions for wireless communication includes one or more instructions that, when executed by one or more processors of a network node, cause the network node to: transmit, to a UE, signaling indicating whether a set of PRGs comprises a subset of PRGs that are associated with a same precoder, wherein the subset of PRGs comprises a plurality of PRGs that span contiguous frequency resources, and wherein the subset of PRGs being associated with the same precoder enables the UE to perform a joint channel estimation; and transmit, to the UE, a transmission via the set of PRGs.

In some aspects, an apparatus for wireless communication includes means for receiving, from a network node, signaling indicating whether a set of PRGs comprises a subset of PRGs that are associated with a same precoder, wherein the subset of PRGs comprises a plurality of PRGs that span contiguous frequency resources; means for receiving, from the network node, a transmission via the set of PRGs; and means for performing a joint channel estimation based on the subset of PRGs when the subset of PRGs are associated with the same precoder.

In some aspects, an apparatus for wireless communication includes means for transmitting, to a UE, signaling indicating whether a set of PRGs comprises a subset of PRGs that are associated with a same precoder, wherein the subset of PRGs comprises a plurality of PRGs that span contiguous frequency resources, and wherein the subset of PRGs being associated with the same precoder enables the UE to perform a joint channel estimation; and means for transmitting, to the UE, a transmission via the set of PRGs.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIGS. 7A-9B are diagrams illustrating example DMRS configurations, in accordance with the present disclosure.

DETAILED DESCRIPTION

Figure 1:
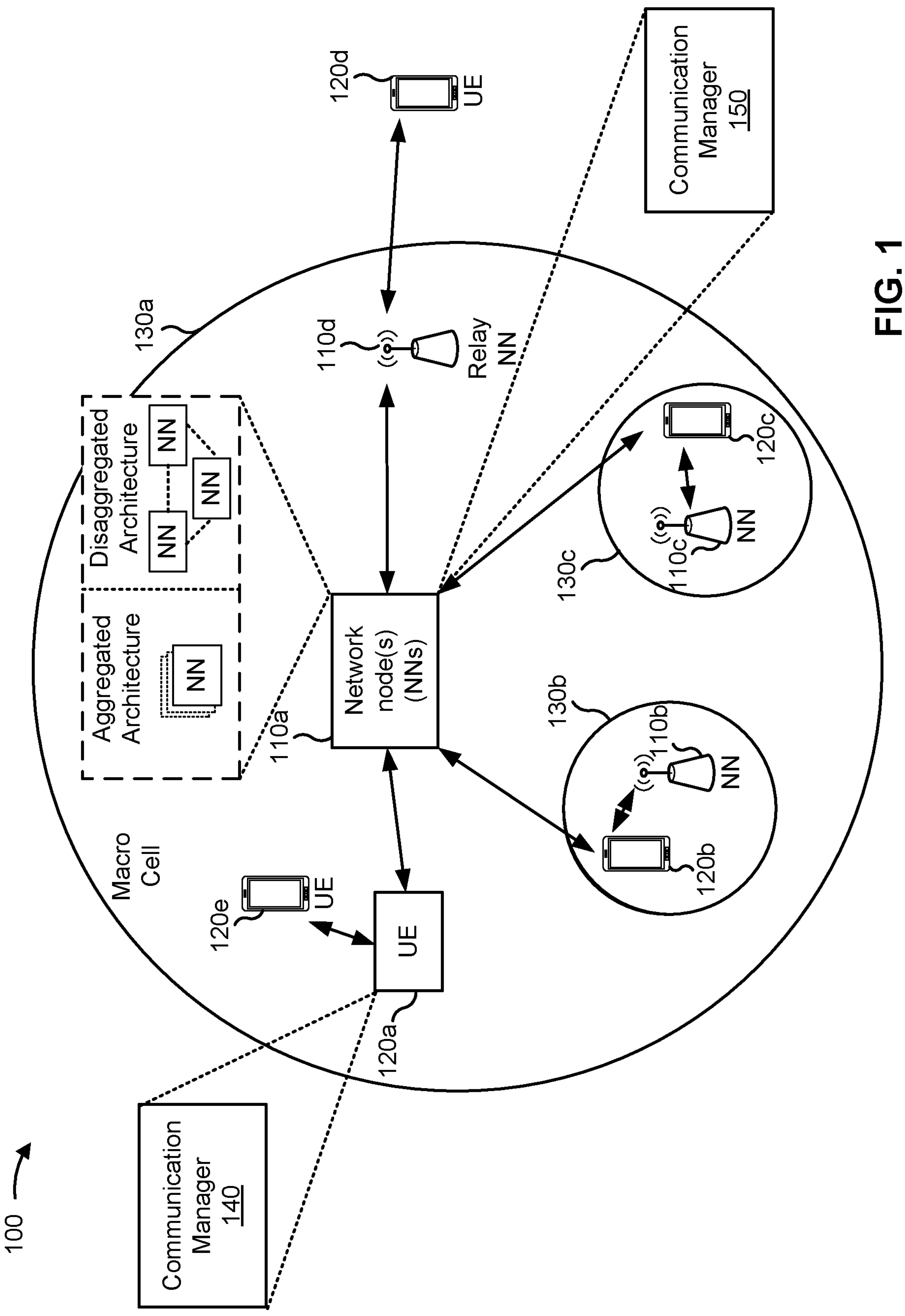
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

In some wireless communication networks, a transmitting device (e.g., a UE, a network node) may include a reference signal in a transmission to enable a receiving device (e.g., a UE, a network node) to estimate a channel associated with the transmission. For example, a network node may transmit communications via a radio channel (e.g., via a physical downlink control channel (PDCCH), via a physical downlink shared channel (PDSCH), via a physical broadcast channel (PBCH)) that includes a demodulation reference signal (DMRS), and the DMRS may carry information that enables the receiving device, such as a UE, to estimate the radio channel. In some cases, the reference signal may not be carried across an entire frequency domain of the radio channel. For example, a subset of frequency domain resources in the radio channel may carry DMRS tones, and another subset of the frequency domain resources in the radio channel may not carry DMRS tones.

To perform channel estimation associated with a set of frequency resources (e.g., a physical resource block group (PRG)) where less than all of the frequency resources (e.g., subcarriers) are carrying DMRS tones, the receiving device may perform interpolation and/or extrapolation. In some nonlimiting examples, channel estimation may refer to DMRS-based channel estimation, channel coefficient estimation, and/or a CSI estimation. That is, for subcarriers in the PRG that are not carrying DMRS tones, but that are between two subcarriers in the PRG that are carrying DMRS tones, the corresponding channel estimation may be based on interpolation. Additionally, for subcarriers in the PRG that are not carrying DMRS tones, and that are not between two subcarriers in the PRG that are carrying DMRS tones (e.g., for subcarriers in the PRG that are edge tones), the corresponding channel estimation may be based on extrapolation.

A reliability of channel estimations that are based on extrapolation may be lower than a reliability of channel estimations that are based on interpolation. In some cases, performing a joint channel estimation associated with one or more PRGs that span contiguous frequency resources may decrease a quantity of subcarriers that are associated with extrapolated channel estimations. That is, the subcarriers that are edge tones in the first PRG (e.g., and therefore associated with extrapolated channel estimations when the receiving device does not perform a joint channel estimation of the first and second PRGs) may be between a first subcarrier in the first PRG that is carrying a DMRS tone and a second subcarrier in the second PRG that is carrying another DMRS tone, and may therefore be associated with interpolated channel estimations when the receiving device does perform a joint channel estimation of the first and second PRG.

To perform the joint channel estimation associated with one or more PRGs that span the contiguous frequency resources, a receiving device may perform a single channel estimation based on all of the one or more PRGs that span contiguous frequency resources. In another example of performing the joint channel estimation associated with one or more PRGs that span the contiguous frequency resources, the receiving device may perform a channel estimation for each of the one or more PRGs that span contiguous frequency resources based on the subcarriers in the respective PRG as well as based on one or more subcarriers in an adjacent PRG (e.g., in another PRG that spans frequency resources that are contiguous to the frequency resources spanned by a first PRG). Here, to perform a channel estimation for a first one of the one or more PRGs that span contiguous frequency resources, the receiving device may perform the channel estimation based on the subcarriers within the first PRG, as well as based on one or more subcarriers within a second PRG and/or one or more subcarriers within a third PRG, where both the second and third PRGs spans frequency resources that are contiguous to the first PRG. In some cases, a joint channel estimation may be referred to as a cross PRG channel estimation.

But the receiving device may be unable to perform joint channel estimations on PRGs that span contiguous frequency resources because a transmitting device may use different precoders for different PRGs. In some nonlimiting examples, a precoder may correspond to a precoding matrix that is associated with a precoding matrix indicator (PMI), and a transmitting device may use the precoder to adjust amplitudes and/or phases of transmissions. In cases that the transmitting device uses different precoders for different PRGs, the transmitting device may transmit signals carried via some PRGs based on different amplitudes and phases than transmissions carried via other PRGs. Therefore, the receiving device may perform separate channel estimations for each PRG.

Various aspects relate generally to the transmitting device using a same precoder for one or more PRGs that span contiguous frequency resources. For example, the transmitting device may use a same precoding matrix (e.g., associated with the same PMI) to precode signals carried via each of the one or more PRGs, which may result in the transmitting device transmitting signals carried via each the one or more PRGs based on the same amplitudes and phases. The transmitting device using the same precoder for the one or more PRGs may enable a receiving device to perform joint channel estimation of the one or more PRGs. In some cases, performing the joint channel estimation of the one or more PRGs that span contiguous frequency resources may improve a reliability of the channel estimation as compared to a case where the receiving device performs separate channel estimations of the one or more PRGs. Some aspects more specifically relate to the transmitting device indicating, to the receiving device, whether a set of PRGs includes a subset of PRGs (e.g., that span contiguous frequency resources) that are associated with a same precoder. A receiving device may perform a joint channel estimation on the one or more PRGs in the subset based on receiving an indication from the transmitting device that the one or more PRGs in the subset are associated with the same precoder. In some cases, the transmitting device indicating whether the set of PRGs includes the subset of PRGs may improve a coordination between devices.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more PDCCHs, and downlink data channels may include one or more PDSCHs. Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node **110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120** that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs"). An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some wireless communication networks 100, a transmitting device (e.g., a UE 120, a network node 110) may include a reference signal in a transmission to enable a receiving device (e.g., a UE 120, a network node 110) to estimate a channel associated with the transmission. For example, a network node 110 may transmit communications via a radio channel (e.g., via a PDCCH, a PDSCH, a PBCH) that include a DMRS, and the DMRS may include information that enables the receiving device, such as a UE 120, to estimate the radio channel. In some cases, the reference signal may not be carried across an entire frequency domain of the radio channel. For example, a subset of the frequency domain resources in the channel may carry DMRS tones, and another subset of the frequency domain resources in the radio channel may not carry DMRS tones.

To perform channel estimation associated with a set of frequency resources (e.g., a PRG) where less than all of the frequency resources are carrying DMRS tones, the receiving device may perform interpolation and/or extrapolation. That is, for subcarriers in the PRG that are not carrying DMRS tones, but that are between two subcarriers in the PRG that are carrying DMRS tones, the corresponding channel estimation may be based on interpolation. Additionally, for subcarriers in the PRG that are not carrying DMRS tones, and that are not between two subcarriers in the PRG that are carrying DMRS tones (e.g., for subcarriers in the PRG that are edge tones), the corresponding channel estimation may be based on extrapolation.

A reliability of channel estimations that are based on extrapolation may be lower as compared to a reliability of channel estimations that are based on interpolation. In some cases, performing a joint channel estimation associated with one or more PRGs that span contiguous frequency resources may decrease a quantity of subcarriers that are associated with extrapolated channel estimations. That is, the subcarriers that are edge tones in the first PRG (e.g., and therefore associated with extrapolated channel estimations when the receiving device does not perform a joint channel estimation of the first and second PRGs) may be between a first subcarriers in the first PRG that is carrying a DMRS tone and a second subcarriers in the second PRG that is carrying another DMRS tone, and may therefore be associated with interpolated channel estimations when the receiving device does perform a joint channel estimation of the first and second PRG. But the receiving device may be unable to perform joint channel estimations on PRGs that span contiguous frequency resources because a transmitting device may use different precoders for different PRGs. Therefore, the receiving device may perform separate channel estimations for each PRG.

In the example of wireless communication network 100, the transmitting device may use a same precoder for one or more PRGs that span contiguous frequency resources, thus enabling a receiving device to perform joint channel estimation of the one or more PRGs. Additionally, the transmitting device may indicate, to the receiving device, whether a set of PRGs includes a subset of PRGs (e.g., that span contiguous frequency resources) that are associated with a same precoder. The receiving device may perform a joint channel estimation on the one or more PRGs in the subset based on receiving an indication from the transmitting device that the one or more PRGs in the subset are associated with the same precoder.

In some aspects, the UE 120 may include a communication manager 140. As described in more detail elsewhere herein, the communication manager 140 may receive, from a network node, signaling indicating whether a set of PRGs comprises a subset of PRGs that are associated with a same precoder, wherein the subset of PRGs comprises a plurality of PRGs that span contiguous frequency resources; receive, from the network node, a transmission via the set of PRGs; and perform a joint channel estimation based on the subset of PRGs when the subset of PRGs are associated with the same precoder. Additionally, or alternatively, the communication manager 140 may perform one or more other operations described herein.

In some aspects, the network node 110 may include a communication manager 150. As described in more detail elsewhere herein, the communication manager 150 may transmit, to a UE, signaling indicating whether a set of PRGs comprises a subset of PRGs that are associated with a same precoder, wherein the subset of PRGs comprises a plurality of PRGs that span contiguous frequency resources, and wherein the subset of PRGs being associated with the same precoder enables the UE to perform a joint channel estimation; and transmit, to the UE, a transmission via the set of PRGs. Additionally, or alternatively, the communication manager 150 may perform one or more other operations described herein.

As indicated above, FIG. 1 is provided as an example. Other examples may differ from what is described with regard to FIG. 1.

Figure 2:
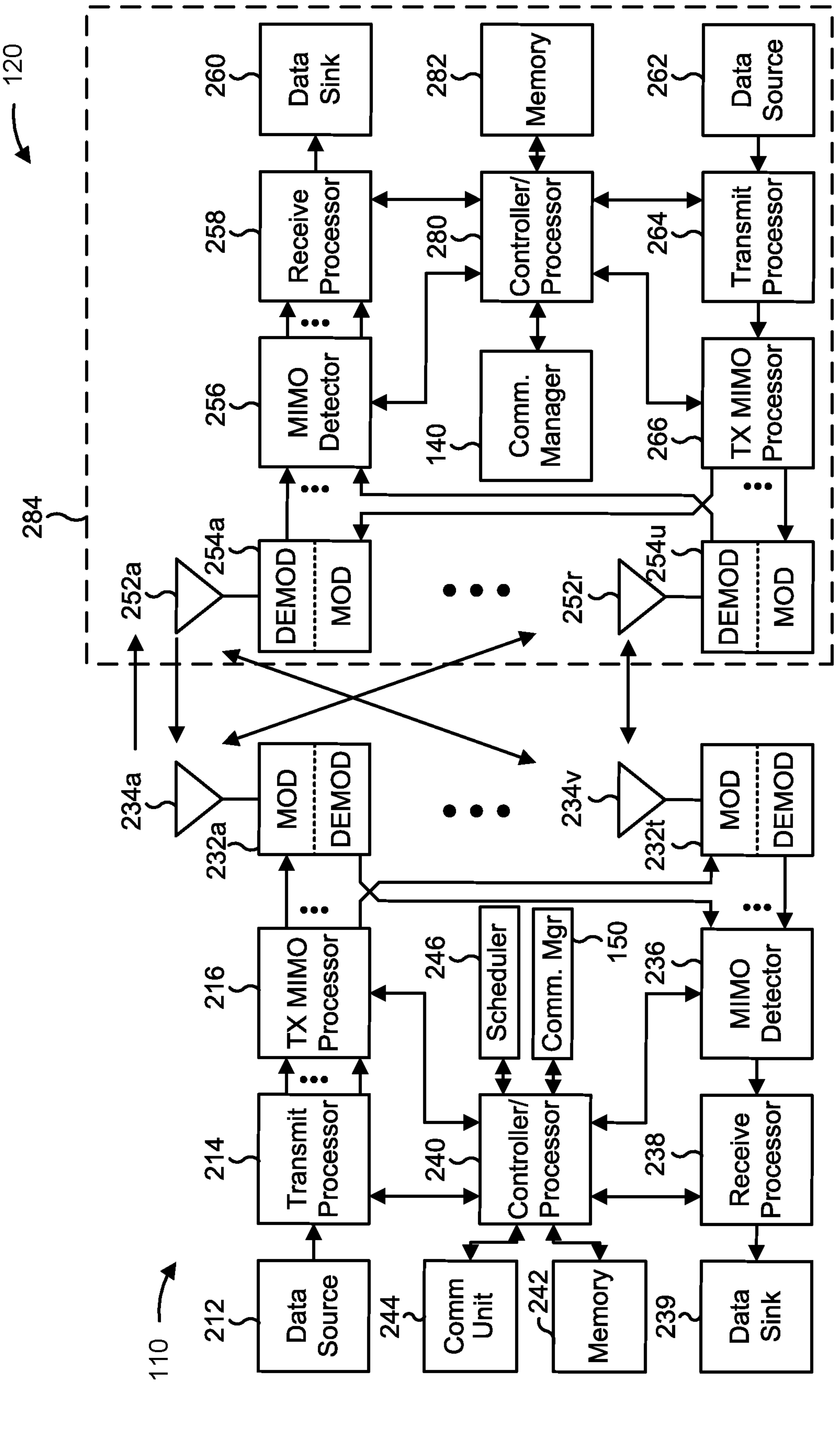
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a DMRS, or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
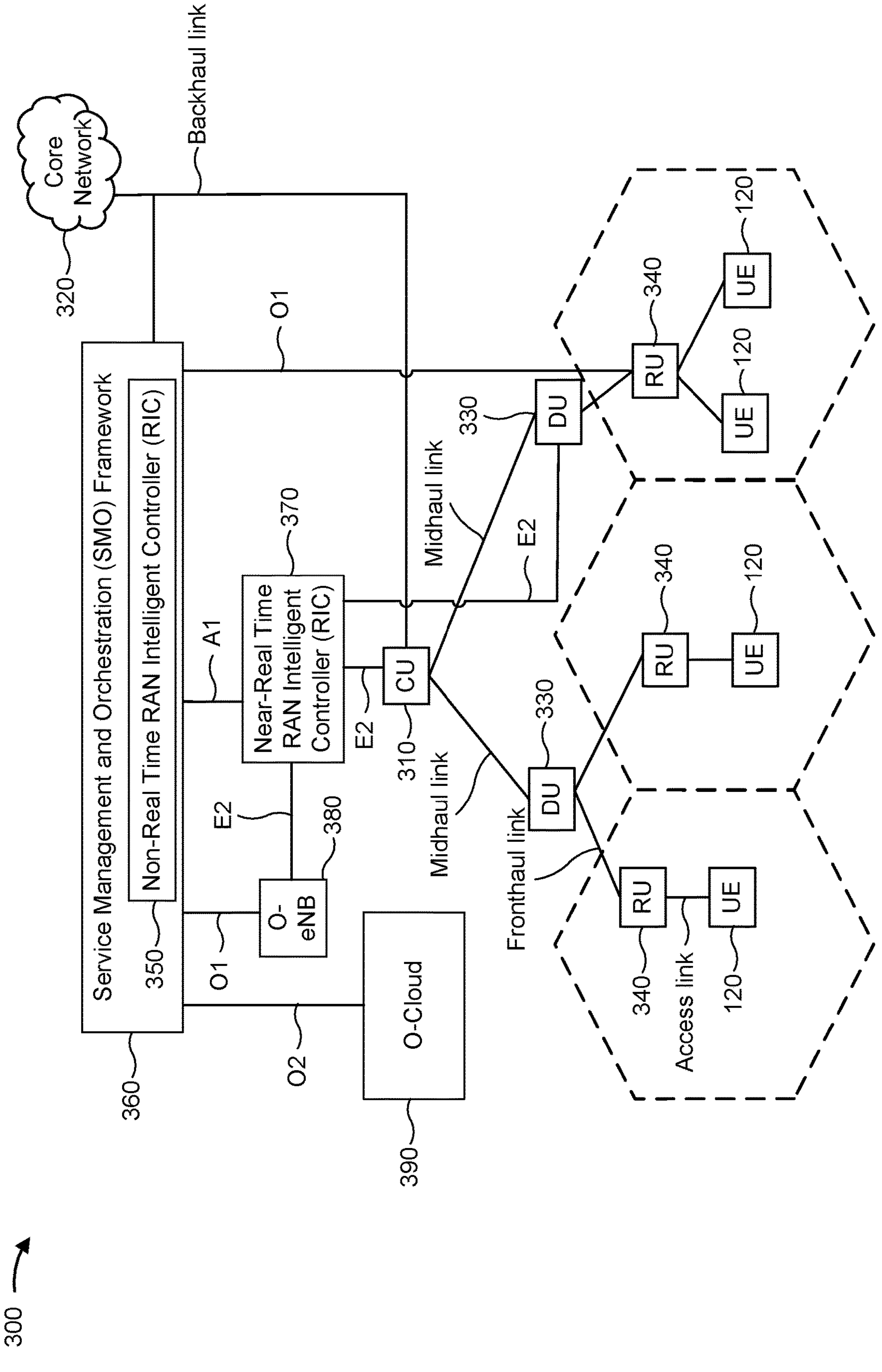
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with channel estimation based on a precoder indication, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 1000 of FIG. 10, process 1100 of FIG. 11, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 1000 of FIG. 10, process 1100 of FIG. 11, or other processes as described herein. In some examples, executing instructions may include running the instructions, converting the instructions, compiling the instructions, and/or interpreting the instructions, among other examples.

In some aspects, the UE 120 includes means for receiving, from a network node, signaling indicating whether a set of PRGs comprises a subset of PRGs that are associated with a same precoder, wherein the subset of PRGs comprises a plurality of PRGs that span contiguous frequency resources; means for receiving, from the network node, a transmission via the set of PRGs; and/or means for performing a joint channel estimation based on the subset of PRGs when the subset of PRGs are associated with the same precoder. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE, signaling indicating whether a set of PRGs comprises a subset of PRGs that are associated with a same precoder, wherein the subset of PRGs comprises a plurality of PRGs that span contiguous frequency resources, and wherein the subset of PRGs being associated with the same precoder enables the UE to perform a joint channel estimation; and means for transmitting, to the UE, a transmission via the set of PRGs. The means for the network node 110 to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

As indicated above, FIG. 3 is provided as an example. Other examples may differ from what is described with regard to FIG. 3.

Figures 4A, 4B:
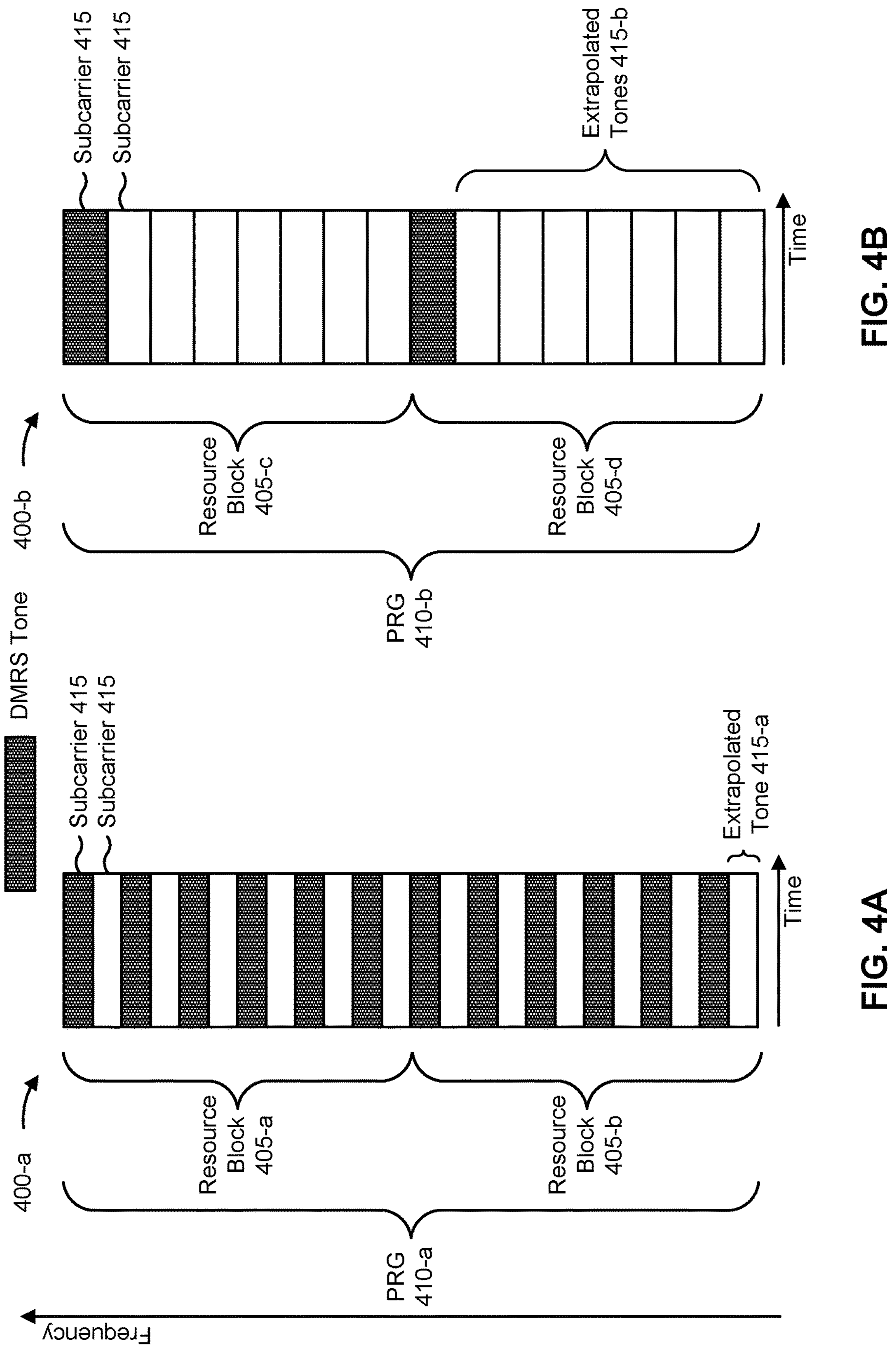
FIGS. 4A and 4B are diagrams illustrating example demodulation reference signal (DMRS) configurations, in accordance with the present disclosure.

FIGS. 4A and 4B are diagrams illustrating example DMRS configurations 400, in accordance with aspects of the present disclosure. The example DMRS configurations 400 may be utilized by a transmitting device, such as a network node 110 or a UE 120, to transmit a DMRS signal via a radio channel. For example, a network node may utilize DMRS configuration 400-*a* or DMRS configuration 400-*b* to transmit a DMRS signal to a UE 120 via a PDSCH.

The DMRS configurations 400 illustrate a DMRS configuration 400 for a PRG 410, and each PRG 410 may include a set of resource blocks 405. A resource block 405 may include a set of subcarriers 415 (e.g., 12 subcarriers, eight subcarriers) and a set of symbols (e.g., 14 symbols) that can be scheduled by a network node as a unit. In some aspects, a resource block 405 may include a set of subcarriers 415 in a single slot. Additionally, a single time-frequency resource included in a resource block 405 may be referred to as a resource element, where a resource element includes a single subcarrier (e.g., in frequency) and a single symbol (e.g., in time). A symbol may be referred to as an OFDM symbol.

In some examples, the PRGs 410 may be for a PDSCH transmission. That is, a network node may utilize the PRGs 410 for transmissions via a PDSCH to a UE. In some cases, a size of the PRGs 410 may be configured by RRC signaling. For example, the network node may transmit RRC signaling, to the UE, indicating a size of the PRG 410. Additionally, or alternatively, the network node may transmit DCI indicating whether PRG 410 is two or four resource blocks 405 or if the PRG 410 is a wideband PRG 410. In the example DMRS configurations 400, the PRGs 410 are each two resource blocks 405. That is, the first PRG 410-*a* includes resource blocks 405-*a* and 405-*b*, while the second PRG 410-*b* includes resource blocks 405-*c* and 405-*d*.

The DMRS configurations 400 illustrate examples where the DMRS is not carried across an entire frequency domain of the PRG 410. That is, in both DMRS configurations 400-*a* and 400-*b*, a subset of the subcarriers 415 in each PRG 410 carry DMRS tones (e.g., illustrated with shaded subcarriers 415 in FIGS. 4A and 4B) and a subset of the subcarriers 415 in each PRG 410 do not carry DMRS tones (e.g., illustrated with non-shaded subcarriers 415 in FIGS. 4A and 4B).

DMRS configuration 400-*a* illustrates an example DMRS configuration 400-*a* for a virtual port 0 with a two layer frequency domain-orthogonal cover code (FD-OCC) 2 configuration. Additionally, DMRS configuration 400-*b* illustrates an example DMRS configuration 400-*b* for a virtual port 0 with a four layer FD-OCC4 configuration.

To perform channel estimation associated with the PRG 410, a receiving device may perform interpolation and/or extrapolation. That is, for subcarriers 415 in the PRG 410 that are not carrying DMRS tones, but that are between two subcarriers 415 in the PRG 410 that are carrying DMRS tones, the corresponding channel estimation may be based on interpolation. In the example 400-*a*, the PRG 410-*a* includes 11 subcarriers 415 that are each disposed between two different subcarriers 415 that are carrying DMRS tones. Here, the receiving device may rely on interpolation to estimate the radio channel condition associated with 11 subcarriers 415. In the example 400-*b*, the PRG 410-*b* includes 7 subcarriers 415 that are disposed between two subcarriers 415 that are carrying DMRS tones. Here, the receiving device may rely on interpolation to estimate the radio channel condition associated with seven subcarriers 415.

Additionally, for subcarriers 415 in the PRG 410-*a* or the PRG 410-*b* that are not carrying DMRS tones, and that are not between two subcarriers 415 in the PRG 410-*a* or the PRG 410-*b* that are carrying DMRS tones (e.g., for subcarriers 415 in the PRG 410 that are edge tones), the corresponding channel estimation may be based on extrapolation. In the example 400-*a*, the PRG 410-*a* may include a single subcarrier 415 that is an edge tone, and corresponds to an extrapolated tone 415-*a*. Here, the receiving device may rely on extrapolation to estimate the radio channel condition associated with the one subcarrier 415 (e.g., corresponding to the extrapolated tone 415-*a*). In the example 400-*b*, the PRG 410-*b* may include seven subcarriers 415 that are edge tones, and correspond to the extrapolated tones 415-*b*. Here, the receiving device may rely on extrapolation to estimate the radio channel condition associated with the seven subcarriers 415 that correspond to the extrapolated tones 415-*b*.

A reliability of channel estimations that are based on extrapolation may be lower than a reliability of channel estimations that are based on interpolation. That is, extrapolated tones may be associated with higher mean squared error (MSE) as compared to an MSE associated with interpolated tones. In some cases, performing a joint channel estimation associated with one or more PRGs that span contiguous frequency resources may decrease a quantity of subcarriers 415 that are associated with extrapolated channel estimations. That is, the subcarriers 415 that are edge tones in a first PRG 410-*a* or a first PRG 410-*b* (e.g., and therefore associated with extrapolated channel estimations when the receiving device does not perform a joint channel estimation of the first PRG 410-*a* or 410-*b* and a second PRG that is contiguous with the first PRG 410-*a* or 410-*b*) may be between a first subcarrier 415 in the first PRG 410-*a* or 410-*b* that is carrying a DMRS tone and a second subcarrier in the second PRG (e.g., not illustrated in FIG. 4A or 4B) that is carrying another DMRS tone, and may therefore be associated with interpolated channel estimations when the receiving device does perform a joint channel estimation of the first PRG 410-*a* or 410-*b* and the second PRG.

However, the receiving device may be unable to perform joint channel estimations on PRGs that span contiguous frequency resources because a transmitting device may use different precoders for different PRGs. That is, for PDSCH channel estimation, a UE may not assume that a precoder used by a network node is the same across PRGs that span contiguous frequency resources unless wideband is indicated. That is, a network node may indicate that either the precoders used for each PRG are selected independently or that the same precoder is used for the PRGs across the entire allocation. Accordingly, unless the network node indicates to the UE that every PRG (e.g., wideband) is associated with a same precoder, the UE may be unable to perform joint channel estimation for two PRGs that span contiguous frequency resources. Therefore, the receiving device may perform separate channel estimations for each PRG.

Various aspects described herein relate to the transmitting device indicating whether two adjacent PRGs 410 are associated with a same precoder (e.g., indicating whether the transmitting device used a same precoder for two adjacent PRGs 410). In cases where the UE knows that two adjacent PRGs 410 are associated with a same precoder, the UE may perform joint channel estimation for the edge tone PRGs 410, which may improve a reliability of the channel estimation (e.g., may decrease an MSE) on the edge tone.

As indicated above, FIGS. 4A and 4B are provided as examples. Other examples may differ from what is described with respect to FIGS. 4A and 4B.

Figure 5:
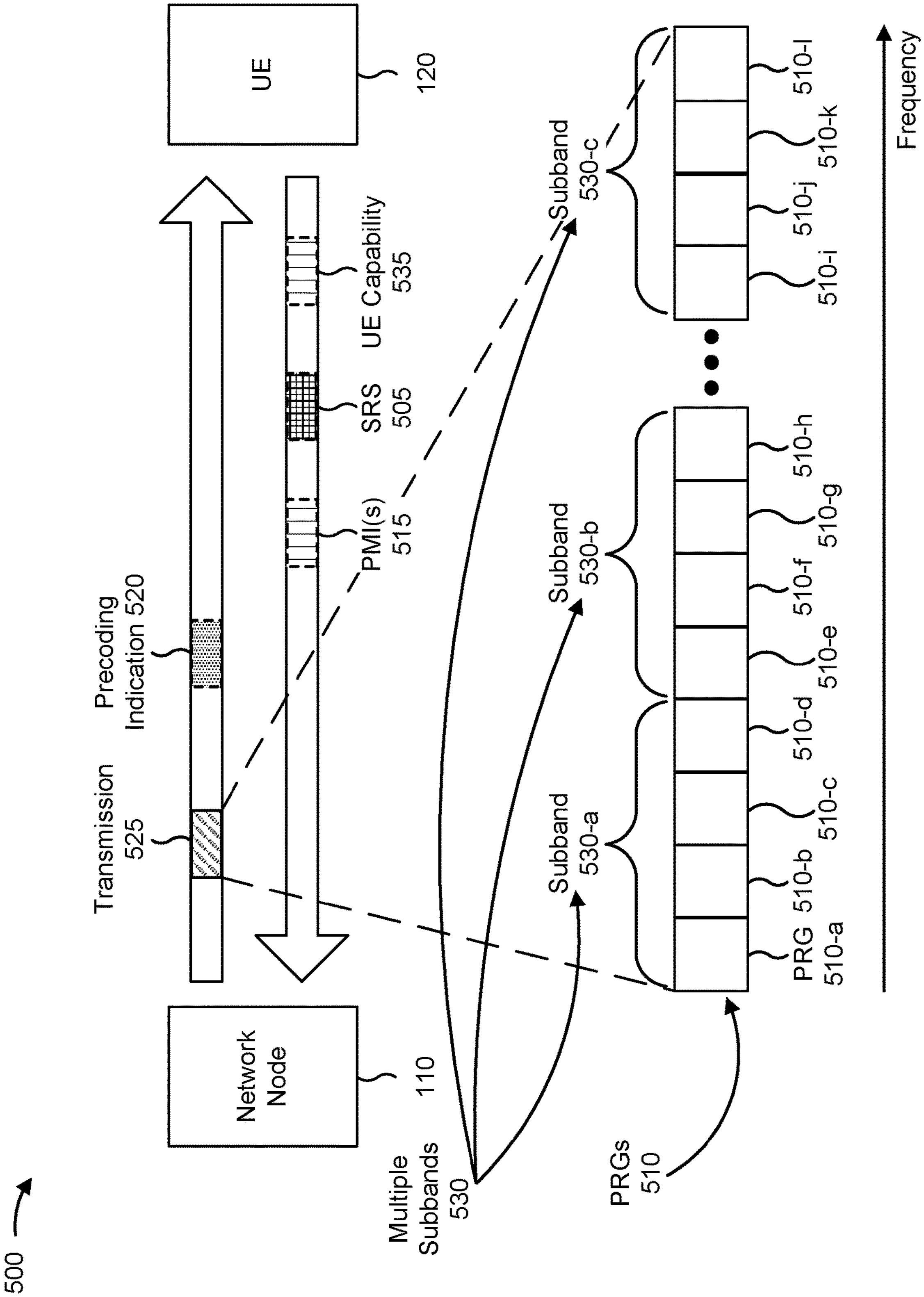
FIG. 5 is a diagram illustrating an example of a wireless communication network, in accordance with the present disclosure.

FIG. 5 is a diagram illustrating an example of a wireless communication network 500, in accordance with the present disclosure. As shown in FIG. 5, a network node 110 and a UE 120 may communicate with one another.

In FIG. 5, the network node 110 may transmit, to the UE 120, a transmission 525 that spans a set of PRGs 510. In some instances, the set of PRGs 510 may span frequency resources that include multiple subbands 530. For example, PRGs 510-*a*, 510-*b*, 510-*c*, and 510-*d* may be within a first subband 530-*a*; PRGs 510-*e*, 510-*f*, 510-*g*, and 510-*h* may be within a second subband 530-*b*; and PRGs 510-*i*, 510-*j*, 510-*k*, and 510-*l* may be within a third subband 530-*c*. While the transmission 525 is illustrated as being within 12 PRGs, the transmission 525 may be transmitted via more or fewer PRGs 510. Additionally, while each subband 530 is illustrated as including four PRGs 510, a subband 530 may include more or fewer PRGs 510. Adjacent PRGs 510 and/or neighboring PRGs 510 may correspond to PRGs 510 that span contiguous frequency resources. For example, PRGs 510-*a* and 510-*b* may span contiguous frequency resources. Additionally, PRGs In some instances, the network node 110 may indicate (e.g., via a wideband indication) that all of the PRGs 510 are encoded using a same precoder. However, in cases where the network node 110 does not transmit a wideband indication to the UE 120, the network node 110 may instead select a precoder for the transmission 525 according to a PRG granularity. For example, the network node 110 may select a precoder for a PRG (e.g., one of the PRGs 510) based on the uplink channel estimation (e.g., associated with an SRS 505). Here, the UE 120 may transmit the SRS 505, which may carry information used for uplink channel estimation, to the network node 110.

In the example of wireless communication network 500, the network node 110 may additionally select the precoder for a PRG (e.g., one of the PRGs 510) based on an extrapolation loss. For example, based on an uplink channel estimation, the network node 110 may select a precoder for a PRG (e.g., one of the PRGs 510), which may be associated with a gain (e.g., an improvement in channel estimations corresponding to that precoder). However, in cases where the gain associated with the selected precoder does not offset an extrapolation loss (e.g., a decrease in accuracy of channel estimations that result from extrapolation), the network node

110 may instead select a precoder for a PRG (e.g., a first one of the PRGs 510) that is the same as a precoder for another PRG (e.g., a second one of the PRGs 510) that spans contiguous frequency resources. For example, in cases where the network node 110 identifies a first precoder, based on an uplink channel estimation, for the PRG 510-*e* that does not offset the extrapolation loss, the network node 110 may encode the PRG 510-*e* using a second precoder that is the same precoder used to encode the neighboring PRG 510-*f*. In this example, the second precoder is different from the first precoder. By selecting the precoder for the PRG 510-*e* that is the same as the precoder for the neighboring PRG 510-*f* (e.g., the PRG 510-*f* that spans frequency resources that are contiguous to the PRG 510-*e*), the UE 120 may be able to perform a joint channel estimation for PRGs 510-*e* and 510-*f*, which may decrease the extrapolation loss corresponding to the joint channel estimation (e.g., as compared to the UE 120 performing separate channel estimations for PRGs 510-*e* and 510-*f*).

The network node 110 may further select the precoder for a PRG (e.g., one of the PRGs 510) based on a UE capability 535. For example, the UE 120 may transmit, and the network node 110 may receive, signaling indicating the UE capability 535. The UE capability 535 may indicate whether the UE 120 is capable of performing joint channel estimation (e.g., cross-PRG channel estimation). In cases where the UE 120 is not capable of performing joint channel estimation associated with PRGs 510 that span contiguous frequency resources and are associated with a same precoder, the network node 110 may not select a precoder that is the same as a precoder used for a neighboring PRG (e.g., one of the PRGs 510) in cases where the precoder does not provide the highest gain. The UE capability 535 may additionally indicate one or more parameters associated with the UE performing channel estimation. For example, the UE capability 535 may indicate a channel estimation algorithm performed by the UE 120 and/or a quantity of edge tones associated with each PRG (e.g., one of the PRGs 510) (e.g., that may be interpolated using joint channel estimation with an adjacent PRG (e.g., one of the PRGs 510). In some nonlimiting examples, the channel estimation algorithm may refer to an minimum mean-square error (MMSE) for performing the channel estimation, interpolation and/or extrapolation techniques for performing the channel estimation, a noise estimation algorithm for performing the channel estimation, and/or a channel coefficient estimation algorithm for performing the channel estimation. Here, the network node 110 may rely on a combination of uplink channel estimation, channel state information, the UE capability 535, estimated precoder gains, and estimated extrapolation losses to select precoders for the transmission 525.

In the example wireless communication network 500, the network node 110 may transmit, to the UE 120, a precoding indication 520 that indicates whether the set of PRGs 510 include a subset of PRGs 510 that span contiguous frequency resources and are associated with a same precoder. That is, the network node 110 may transmit, to the UE 120, a transmission 525 that spans the set of PRGs 510. The UE 120 may determine whether to perform one or more joint channel estimations on the transmission 525 in response to the precoding indication 520.

In some aspects of the disclosure, the precoding indication 520 may indicate subsets of contiguous PRGs 510 in which the precoding is constant. For example, the network node 110 may transmit, to the UE 120, signaling (e.g., via the precoding indication 520) that indicates a subset of the PRGs 510 (e.g., from the set of PRGs 510 that carry the transmission 525) that are associated with a same precoder. That is, the network node 110 may select a same precoder for a quantity PRGs 510 that span contiguous frequency resources, and may select different precoders for different subsets of PRGs 510 across the entire allocation of PRGs 510 that carry the transmission 525. For example, the network node 110 may select a first precoder for a first subset of PRGs 510-*a*, 510-*b*, 510-*c*, and 510-*d*; a second precoder (e.g., the second precoder being different from the first precoder) for a second subset of PRGs 510-*e*, 510-*f*, 510-*g*, and 510-*h*; and a third precoder (e.g., the third precoder being different from the first and second precoders) for a third subset of PRGs 510-*i*, 510-*j*, 510-*k*, and 510-*l*.

In one example, the precoding indication 520 may be an explicit indication of subsets of contiguous PRGs 510 in which the precoding is constant. For example, the precoding indication 520 may include a bitmap that specifically indicates, for each PRG (e.g., one of the PRGs 510), an associated precoder, or an associated subset of PRGs 510 that are associated with a same precoder. Additionally, or alternatively, the precoding indication 520 may be an implicit indication of subsets of contiguous PRGs 510 in which the precoding is constant. For example, the precoding indication 520 may indicate a quantity of contiguous PRGs 510 in which the precoding is constant (e.g., may indicate a quantity of PRGs 510 associated with a same precoder). In some cases, implicitly indicating the subset(s) of PRGs 510 that are associated with a same precoder may be associated with reduced signaling overhead (e.g., as compared to explicitly indicating the subset(s) of PRGs 510 that are associated with a same precoder).

In another example, the precoding indication 520 may be a soft indication of whether the set of PRGs 510 includes one or more subsets of PRGs 510 that are associated with a same precoder. For example, the precoding indication 520 may indicate a likelihood that the set of PRGs 510 includes a subset of PRGs 510 that span contiguous frequency resources and are associated with a same precoder. That is, the network node 110 may transmit the precoding indication 520 to the UE 120 to indicate whether joint channel estimation (e.g., based on adjacent PRGs 510) is recommended, and therefore is likely.

In some cases, the network node 110 may determine whether joint channel estimation is recommended based on a channel condition and precoders that are selected by the network node 110. For example, in cases where the network node 110 selects varying precoders for PRGs 510 that span contiguous frequency resources, or in cases where the uplink channel estimation (e.g., the SRS estimated channel) is relatively flat, there may be a decreased advantage (e.g., improvement in channel estimation accuracy) associated with joint channel estimations. Here, the network node 110 may indicate, via the precoding indication 520, that joint channel estimation is not likely. That is, if the network node 110 does not identify a gain (e.g., an improvement in channel estimation accuracy) resulting from the joint channel estimation, the network node 110 may indicate, via the precoding indication 520, that joint channel estimation is not likely. In some cases, a precoding indication 520 that indicates a likelihood of the set of PRGs 510 including one or more subsets of PRGs 510 that span contiguous frequency resources and are associated with a same precoder may correspond to a single bit (e.g., in DCI signaling).

In cases where the precoding indication 520 indicates that it is likely that the set of PRGs 510 includes a subset of PRGs 510 that span contiguous frequency resources and are associated with a same precoder, the UE 120 may detect whether PRGs 510 that span contiguous frequency resources are associated with a same precoder prior to performing a joint channel estimation. In some instances, an accuracy of the UE 120 detecting whether the PRGs 510 that span contiguous frequency resources are associated with a same precoder may be based on a signal quality of the transmission 525. For example, in cases where a signal-to-noise ratio (SNR) of the transmission 525 is relatively high, the UE 120 may be unable to accurately detect whether PRGs 510 that span contiguous frequency resources are associated with a same precoder.

Additionally, in cases where the precoding indication 520 indicates that it is unlikely that the set of PRGs 510 includes a subset of PRGs 510 that span contiguous frequency resources and are associated with a same precoder, the UE 120 may refrain from detecting whether PRGs 510 that span contiguous frequency resources are associated with a same precoder, and may instead perform channel estimation for each PRG (e.g., one of the PRGs 510) independently (e.g., without performing joint channel estimation).

In another example, the precoding indication 520 may indicate if a precoder is chosen based on PMIs 515 indicated to the network node 110 by the UE 120. That is, for codebook based precoding, the UE 120 may transmit (e.g., within a CSI report) PMIs 515 associated with each subband 530. That is, in cases where the subbands 530 are CSI subbands, the PMIs 515 may include a first PMI 515 associated with the CSI subband 530-*a* that indicates a first precoder, a second PMI 515 associated with the CSI subband 530-*b* that indicates a second precoder, and a third PMI 515 associated with the CSI subband 530-*c* that indicates a third precoder.

If the network node 110 encodes a CSI subband 530 using a precoder corresponding to the PMI 515 received from the UE 120, a subset of PRGs 510 that are within that CSI subband 530 may be associated with a same precoder. That is, a CSI subband 530 may include multiple resource blocks (e.g., four resource blocks, eight resource blocks, 16 resource blocks, 32 resource blocks), and each PRG (e.g., one of the PRGs 510) may include two or four resource blocks. Accordingly, each CSI subband 530 may include 1-16 PRGs 510. In cases where the CSI subbands 530 include more than one PRG (e.g., one of the PRGs 510), and the network node 110 selects a precoder for the entire CSI subband 530 in accordance with the precoder indicated by the corresponding PMI 515, the UE 120 may be able to perform a joint channel estimation on the PRGs 510 that are within the CSI subband 530.

In this example, the precoding indication 520 may indicate whether the transmission 525 is encoded using the precoders indicated by the PMIs 515. In one case, the precoding indication 520 may indicate whether the precoders are chosen in accordance with the PMIs 515. Here, the precoding indication 520 may include a single bit (e.g., transmitted via DCI) that indicates that either all of the PRGs 510 are encoded using precoders that correspond to the PMIs 515 or that all of the PRGs 510 are not encoded using precoders that correspond to the PMIs 515. In another case, the precoding indication 520 may indicate, for each subband 530, whether each of the PRGs 510 in that subband 530 are encoded using the same precoder that corresponds to the PMI 515 associated with that subband 530, or whether the PRGs 510 in that subband 530 are not encoded using the same precoder that corresponds to the PMI 515 associated with that subband 530. Here, the precoding indication 520 may indicate which subbands 530 (e.g., which CSI subbands 530) are encoded using precoders that correspond to the PMI 515 associated with that subband via L1 signaling.

In cases where the precoding indication 520 indicates that the PRGs 510 within a subband 530 are associated with a same precoder (e.g., as was indicated in the corresponding PMI 515), the UE 120 may perform a joint channel estimation on each of the PRGs 510 within that subband 530. Additionally, in cases where the precoding indication 520 indicates that the PRGs 510 within a subband are not associated with the same precoder as was indicated in the corresponding PMI, the UE 120 may perform channel estimations on each PRG (e.g., one of the PRGs 510) in the subband 530 independently.

As indicated above, FIG. 5 is provided as an example. Other examples may differ from what is described with respect to FIG. 5.

Figure 6:
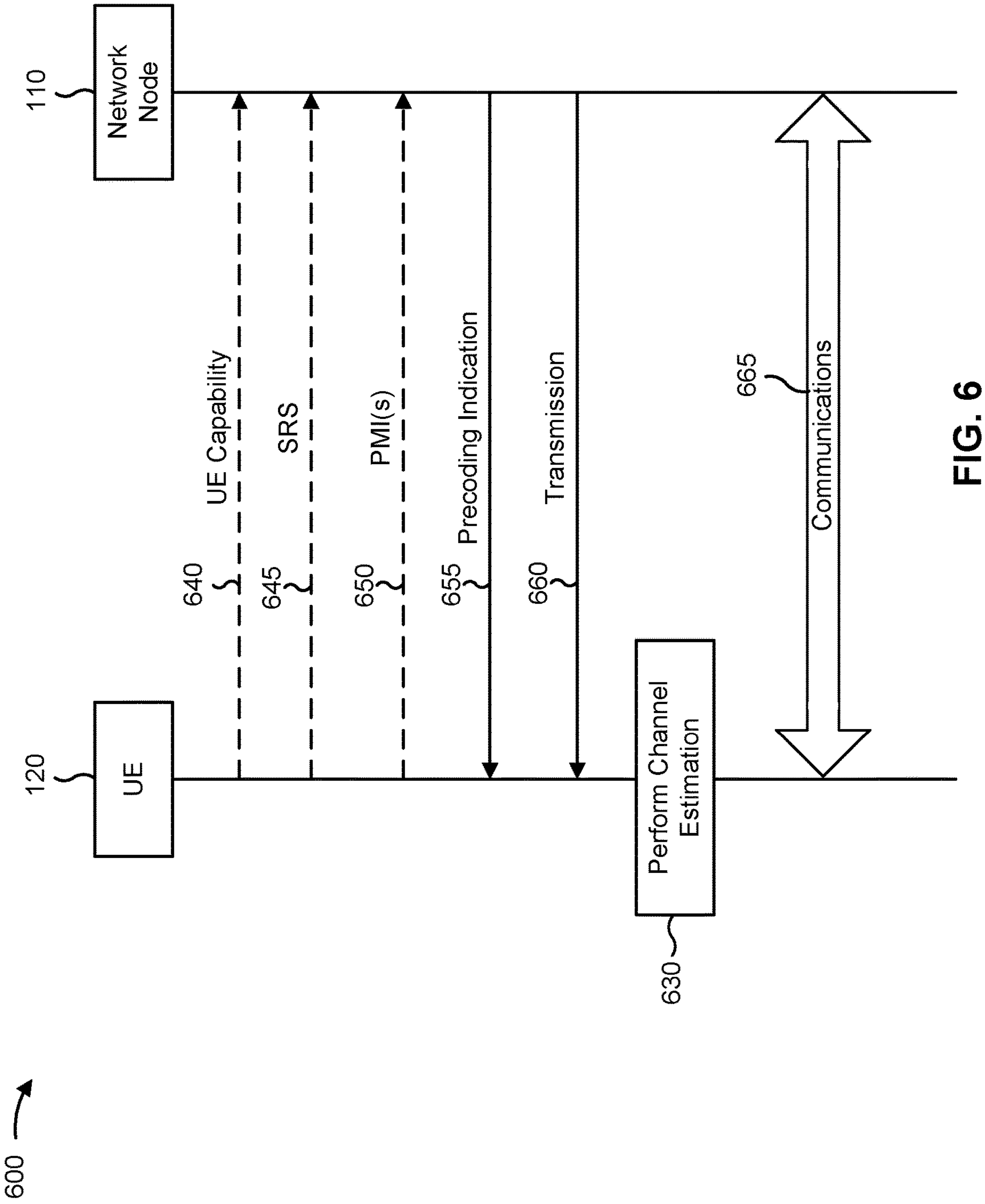
FIG. 6 is a diagram illustrating an example of signaling exchanged between a network node and a UE, in accordance with the present disclosure.

FIG. 6 is a diagram illustrating an example 600 of signaling exchanged between a network node 110 and UE 120, in accordance with the present disclosure. In some cases, the network node 110 and UE 120 described with reference to the wireless communication network 500 may implement aspects of the example 600.

The UE 120 may optionally transmit, and the network node 110 may receive, a UE capability 640. The UE capability 640 may include aspects of the UE capability 535 described with reference to FIG. 5. The UE capability 640 may indicate whether the UE 120 is capable of performing joint channel estimation (e.g., cross-PRG channel estimation). The UE capability 640 may additionally indicate one or more parameters associated with the UE performing channel estimation.

The UE 120 may optionally transmit, and the network node 110 may receive, an SRS 645. The SRS 645 may include aspects of the SRS 505 described with reference to FIG. 5. In some cases, the network node 110 may perform an uplink channel estimation based on the SRS 645.

The UE 120 may optionally transmit, and the network node 110 may receive, one or more PMIs 650. The one or more PMIs 650 may include aspects of the one or more PMIs 515 described with reference to FIG. 5. For example, in cases where the network node 110 utilizes codebook-based precoding, the UE 120 may transmit (e.g., within a CSI report) PMIs 650.

The network node 110 may transmit, and the UE 120 may receive, a precoding indication 655 that indicates whether the set of PRGs include a subset of PRGs that span contiguous frequency resources and are associated with a same precoder. In some cases, the precoding indication 655 may include aspects of the precoding indication 520 described with reference to FIG. 5.

The network node 110 may transmit, and the UE 120 may receive, a transmission 660 via a set of PRGs. In some cases, the transmission 660 may include aspects of a transmission 525 described with reference to FIG. 5.

At 630, the UE 120 may perform a channel estimation in response to receiving the transmission 660. For example, the transmission 660 may include one or more reference signals (e.g., DMRSs). Based on the precoding indication 655, the UE 120 may determine whether to perform one or more joint channel estimations on the transmission 660. For example, if the precoding indication 655 indicates that the set of PRGs includes a subset of PRGs that span contiguous resources in a frequency domain and are associated with a same precoder, the UE 120 may perform a joint channel estimation on the PRGs that are within the subset. If the precoding indication 655 indicates that the set of PRGs does not include a subset of PRGs that span contiguous resources in a frequency domain and are associated with a same precoder, the UE 120 may refrain from performing a joint channel estimation on any of the PRGs associated with the transmission 660.

The UE 120 and the network node 110 may exchange communications 665. That is, the UE 120 and the network node 110 may communicate based on a result of the channel estimation at 630. The communications 665 may include the UE 120 receiving transmissions from the network node 110 based on the result of the channel estimation.

Figures 7A, 7B:
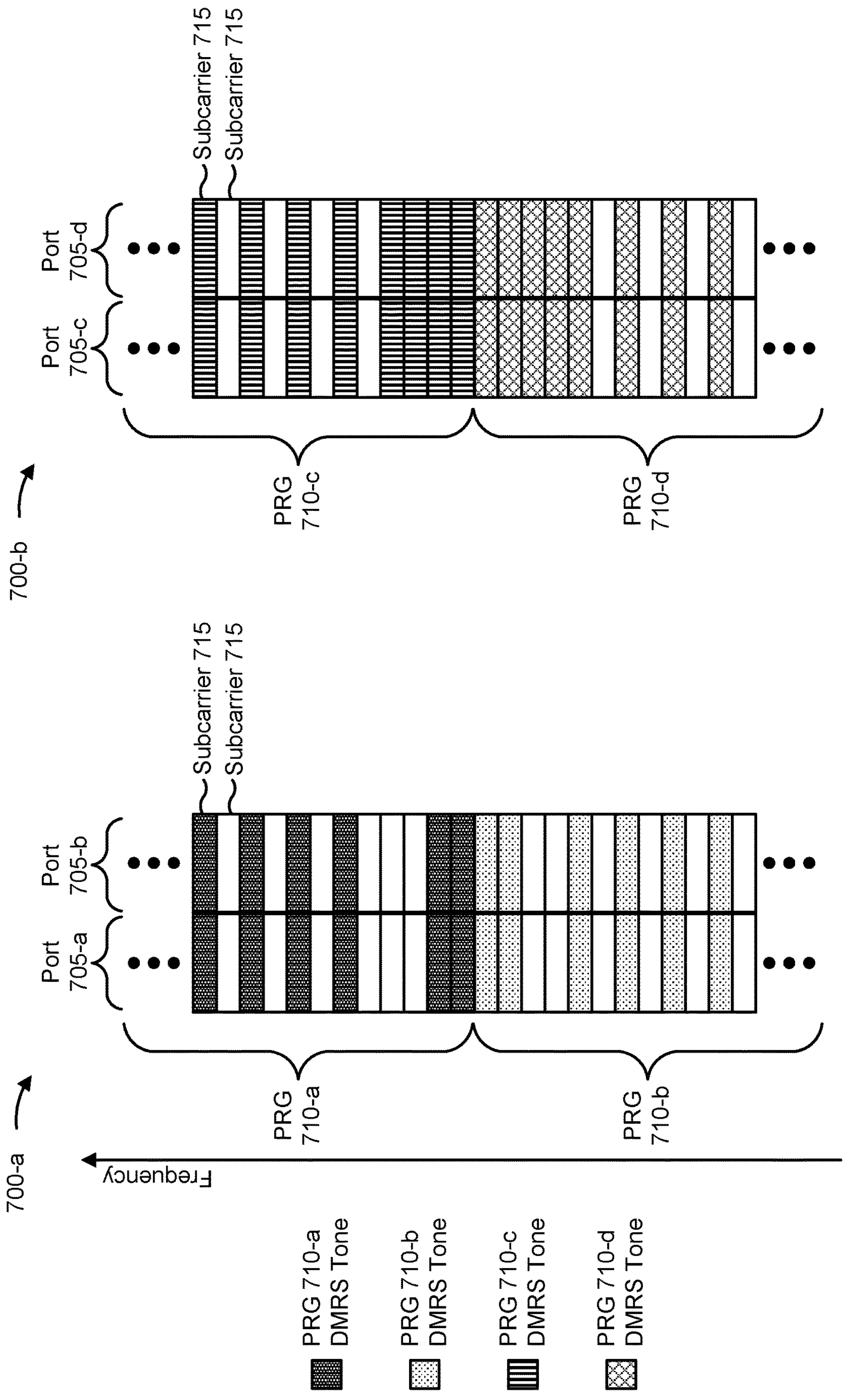

FIGS. 7A and 7B are diagrams illustrating example DMRS configurations 700, in accordance with aspects of the present disclosure. The example DMRS configurations 700 may be utilized by a transmitting device, such as a network node 110 or a UE 120, to transmit a DMRS signal via a radio channel. For example, a network node may utilize DMRS configuration 700-*a* or DMRS configuration 700-*b* to transmit a DMRS signal to a UE 120 via a PDSCH.

The DMRS configurations 700 may illustrate DMRS configurations for two adjacent PRGs. For example, the DMRS configuration 700-*a* may illustrate a DMRS configuration 700-*a* for the PRG 710-*a* and the PRG 710-*b*, where the PRGs 710-*a* and 710-*b* span contiguous frequency resources. Additionally, the DMRS configuration 700-*b* may illustrate a DMRS configuration 700-*b* for the PRG 710-*c* and the PRG 710-*d*, where the PRGs 710-*c* and 710-*d* span contiguous frequency resources. Each of the PRGs may include a set of subcarriers 715, and the DMRS configurations 700 may correspond to a pattern of DMRS tones carried by the set of subcarriers 715. In some instances, the pattern of DMRS tones carried by the set of subcarriers 715 in a PRG may be referred to as a DMRS pattern.

Each of the DMRS configurations 700-*a* and 700-*b* may be associated with two ports (e.g., the DMRS configurations 700-*a* and 700-*b* may be two-layer DMRS patterns). For example, the DMRS configuration 700-*a* may be for a two-layer DMRS pattern of DMRS tones across the set of subcarriers 715 and over the two ports 705-*a* and 705-*b* (e.g., a port #0 and a port #1 of the transmitting device). Additionally, the DMRS configuration 700-*n* may also be for a two-layer DMRS pattern of DMRS tones across the set of subcarriers 715 and over the two ports 705-*c* and 705-*d* (e.g., a port #0 and a port #1 of the transmitting device).

In some examples, a size of the PRGs (e.g., the PRGs 710-*a*, 710-*b*, 710-*c*, and/or 710-*d*) may be configured by a network node. For example, the network node may configure the size of the PRGs statically (e.g., as four resource blocks, or as a wideband PRG). In another example, the network node may configure candidate sizes of the PRGs via RRC signaling. For example, the network node may indicate that the size of the PRGs is selected from a set of one or more candidate sizes, where a set of candidate sizes may include, for example, four resource blocks, a wideband PRG, two resource blocks and a wideband PRG, or four resource blocks and a wideband PRG. Here, the network node may indicate (e.g., via DCI) the size of the PRGs from the set of candidate sizes.

In the example DMRS configurations 700-*a* and 700-*b*, the PRGs may be configured with a size of two resource blocks or four resource blocks (e.g., may not be configured as wideband PRGs). Accordingly, the transmitting device may apply a different precoder for each PRG.

Because the precoder may change from PRG to PRG in the example DMRS configurations 700-*a* and 700-*b*, a receiving device may not perform joint channel estimation (e.g., cross PRG channel estimation) as described herein. Instead, a receiving device may perform independent channel estimations for each PRG. That is, in the example of DMRS configuration 700-*a*, the receiving device may perform independent channel estimations for the PRG 710-*a* and the PRG 710-*b*. Additionally, in the example of DMRS configuration 700-*b*, the receiving device may perform independent channel estimations for the PRG 710-*c* and the PRG 710-*d*.

The DMRS configurations 700-*a* and 700-*b* may be example DMRS configurations where a density of DMRS tones on one or more edges (e.g., boundaries) of the PRG is greater than a density of DMRS on tones closer to a center frequency of the PRG. In some cases, increasing a density of DMRS tones on the one or more edges of a PRG may improve a channel estimation of that PRG. For example, for per-PRG frequency MMSE channel estimation, increasing the density of DMRS tones on one or more of the edges of the PRG may improve the channel estimation for each PRG.

In the example of DMRS configurations 700-*a* and 700-*b*, a transmitting device may apply a frequency domain orthogonal cover code (FD-OCC) on a per-PRG basis. That is, the transmitting device may apply an FD-OCC on the DMRS tones associated with each PRG (e.g., independently of an FD-OCC applied to the DMRS tones associated with another PRG). For example, the transmitting device may apply a first FD-OCC to the DMRS tones associated with the PRG 710-*a* (e.g., the PRG 710-*a* DMRS tones), a second FD-OCC to the DMRS tones associated with the PRG 710-*b* (e.g., the PRG 710-*b* DMRS tones), a third FD-OCC to the DMRS tones associated with the PRG 710-*c* (e.g., the PRG 710-*c* DMRS tones), and a fourth FD-OCC to the DMRS tones associated with the PRG 710-*d* (e.g., the PRG 710-*d* DMRS tones).

Additionally, the receiving device may rely on the DMRS tones associated with each PRG to perform a channel estimation for that PRG. For example, the receiving device may perform a first channel estimation of the PRG 710-*a* based on the DMRS tones associated with the PRG 710-*a* (e.g., the PRG 710-*a* DMRS tones), a second channel estimation of the PRG 710-*b* based on the DMRS tones associated with the PRG 710-*b* (e.g., the PRG 710-*b* DMRS tones), a third channel estimation of the PRG 710-*c* based on the DMRS tones associated with the PRG 710-*c* (e.g., the PRG 710-*c* DMRS tones), and a fourth channel estimation of the PRG 710-*d* based on the DMRS tones associated with the PRG 710-*d* (e.g., the PRG 710-*d* DMRS tones).

In the example DMRS configuration 700-*a*, each PRG 710-*a* and 710-*b* may include a same quantity of DMRS tones as other DMRS patterns (e.g., as another DMRS pattern where a DMRS tone is carried by every other subcarrier 715). Here, to increase the density of DMRS tones on the edges of the PRGs 710-*a* and 710-*b*, two DMRS tones are moved (e.g., from subcarriers that are closer to a center frequency of the PRG 710-*a* and 710-*b*) toward the edge or boundary of the PRG 710-*a*. For example, two DMRS tones in the lower frequencies of the PRG 710-*a* are moved to the bottom two edge subcarriers 715 of the PRG 710-*a*, thus increasing a density of the DMRS tones near the boundary of the PRG 710-*a* (e.g., the boundary between the PRG 710-*a* and the adjacent PRG 710-*b*). Additionally, two DMRS tones in the upper part frequencies of the PRG 710-*b* are moved to the top two edge subcarriers 715 of the PRG 710-*b*, thus increasing a density of the DMRS tones near the boundary of the PRG 710-*b* (e.g., the boundary between the PRG 710-*b* and the adjacent PRG 710-*a*).

In the example DMRS configuration 700-*b*, each PRG 710-*c* and 710-*d* may include a more DMRS tones as other DMRS patterns (e.g., as another DMRS pattern where a DMRS tone is carried by every other subcarrier 715). Here, to increase the density of DMRS tones on the edges of the PRGs 710-*c* and 710-*d*, two DMRS tones are added to the subcarriers 715 near the edge or boundary of the PRGs 710-*c* and 710-*d*. For example, two DMRS tones are added in the lower frequencies of the PRG 710-*c*, thus increasing a density of the DMRS tones near the boundary of the PRG 710-*c* (e.g., the boundary between the PRG 710-*c* and the adjacent PRG 710-*d*). Additionally, two DMRS tones are added in the upper part frequencies of the PRG 710-*d*, thus increasing a density of the DMRS tones near the boundary of the PRG 710-*d* (e.g., the boundary between the PRG 710-*d* and the adjacent PRG 710-*c*).

A network node may select a pattern of DMRS tones (e.g., a DMRS pattern) based on a channel condition. For example, the network node may select a DMRS pattern associated with either DMRS configuration 700-*a* or 700-*b*, or another DMRS pattern not illustrated, based on the channel condition.

In one example, the receiving device may identify the DMRS pattern (e.g., associated with one of the DMRS configurations 700-*a* or 700-*b*) based on (e.g., in response) the transmitting device configuring the size of the PRGs. For instance, a network node may configure (e.g., via RRC signaling) a DMRS pattern for each candidate size of the PRGs (e.g., two resource blocks, four resource blocks, wideband). Then, the receiving device may identify the DMRS pattern (e.g., that corresponds to one of the DMRS configurations 700-*a* or 700-*b*) as the DMRS pattern that is configured (e.g., via DCI signaling) for the corresponding size of the PRGs. That is, in a case that the network node configured the DMRS pattern corresponding to the DMRS configuration 700-*a* for PRGs having a size of two resource blocks, if the network node configures the PRGs to have two resource blocks, the receiving device may identify that pattern of DMRS tones for the PRGs corresponds to the DMRS configuration 700*a*. In some cases, the network node may configure DMRS patterns having a greater density of DMRS tones on one or more edges (e.g., boundaries) of the PRG than a density of DMRS on tones closer to a center frequency of the PRG for PRGs that are two resource blocks or four resource blocks. Additionally, the network node may configure DMRS patterns having a consistent density of DMRS tones across the PRG (e.g., where DMRS tones occur every n subcarriers throughout the PRG) for PRGs that are wideband.

In another example, the transmitting device may transmit explicit signaling, to the receiving device, indicating a DMRS pattern for a set of PRGs. For instance, the network node may configure (e.g., via RRC signaling) multiple DMRS patterns (e.g., corresponding to the DMRS configurations 700-*a* and 700-*b*) for each PRG candidate size (e.g., for two resource block PRGs, for four resource block PRGs, for wideband PRGs). Additionally, the network node may transmit signaling (e.g., via an L1 signal) indicating a DMRS pattern for the PRG from the multiple DMRS patterns configured for that PRG size. In some cases, the network node may indicate the size of the PRG to the receiving device via RRC signaling or via a combination of RRC and DCI signaling. Additionally, a DCI codepoint may be used to signal which DMRS pattern (e.g., associated with the indicated PRG size) for the receiving device to use for channel estimation.

Figure 8B:
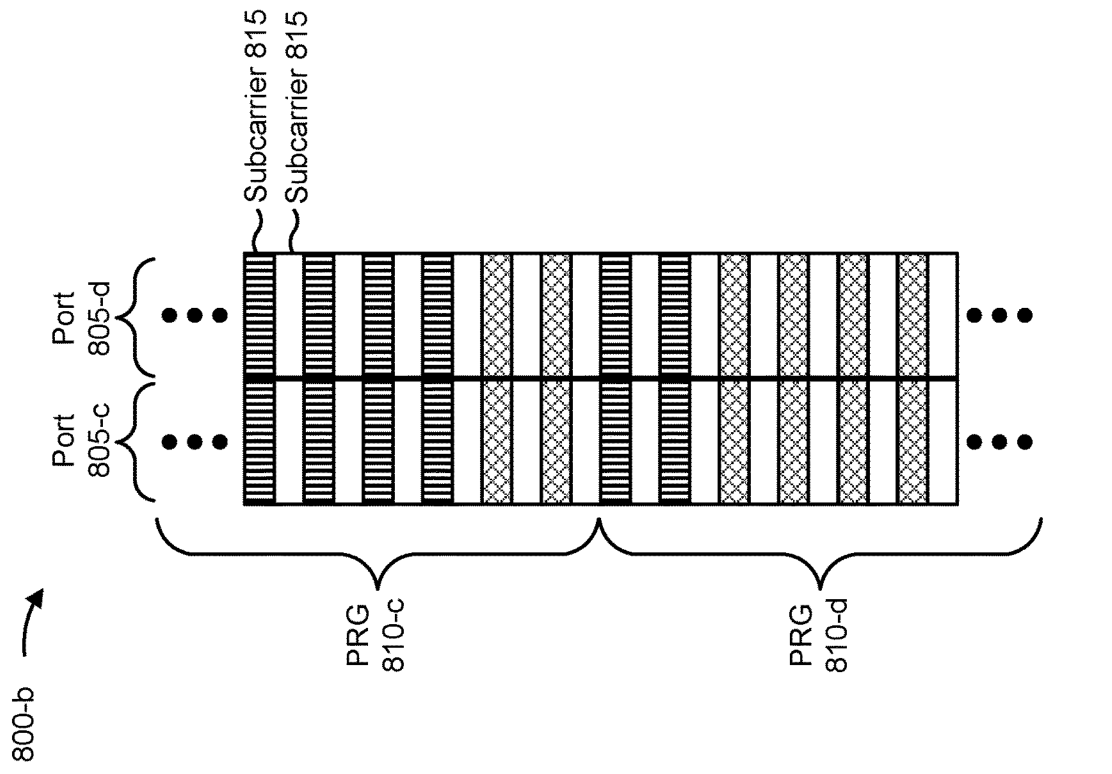
Figure 8A:
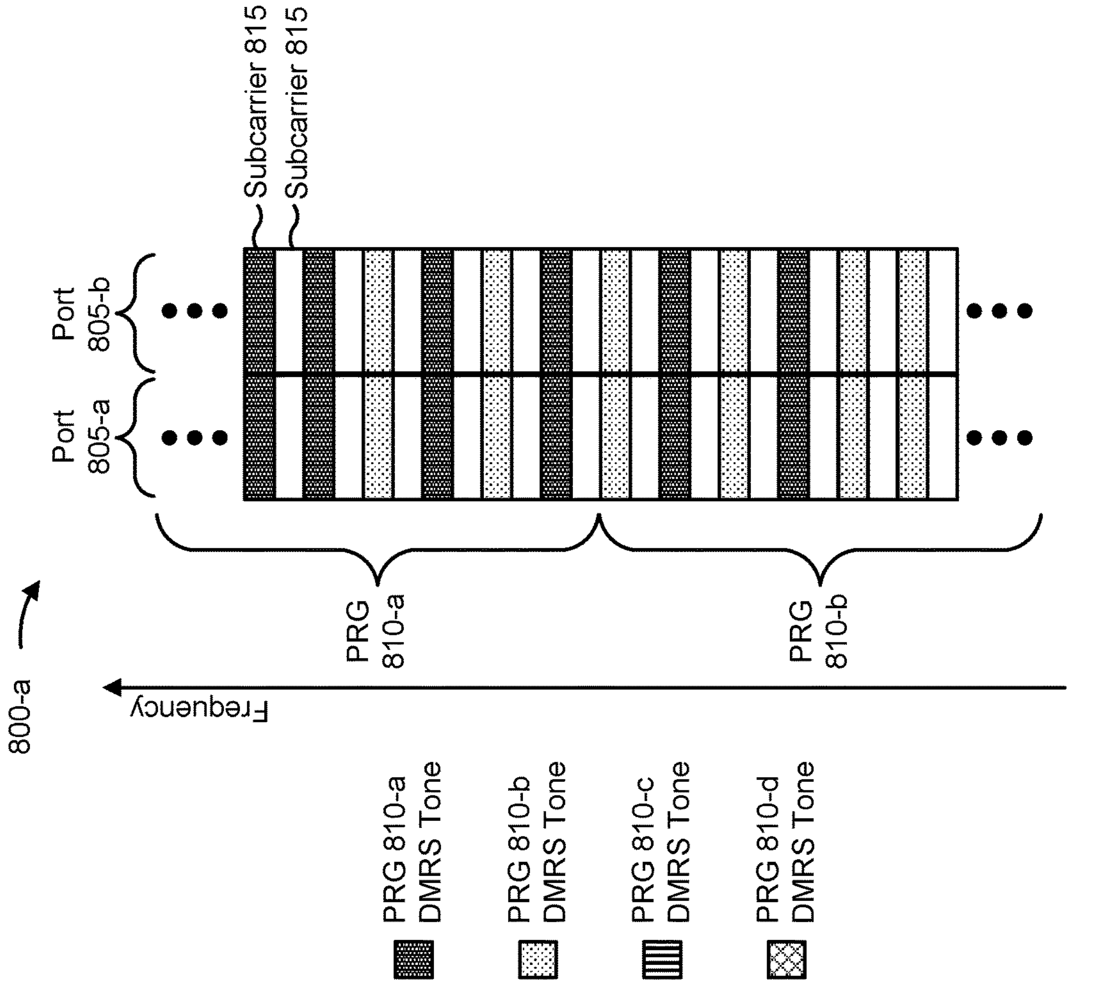

FIGS. 8A and 8B are diagrams illustrating example DMRS configurations 800, in accordance with aspects of the present disclosure. The example DMRS configurations 800 may be utilized by a transmitting device, such as a network node 110 or a UE 120, to transmit a DMRS signal via a radio channel. For example, a network node may utilize DMRS configuration 800-*a* or DMRS configuration 800-*b* to transmit a DMRS signal to a UE 120 via a PDSCH.

The DMRS configurations 800 may illustrate DMRS configurations for two adjacent PRGs. For example, the DMRS configuration 800-*a* may illustrate a DMRS configuration 800-*a* for the PRG 810-*a* and the PRG 810-*b*, where the PRGs 810-*a* and 810-*b* span contiguous frequency resources. Additionally, the DMRS configuration 800-*b* may illustrate a DMRS configuration 800-*b* for the PRG 810-*c* and the PRG 810-*d*, where the PRGs 810-*c* and 810-*d* span contiguous frequency resources. Each of the PRGs may include a set of subcarriers 815, and the DMRS configurations 800 may correspond to a pattern of DMRS tones carried by the set of subcarriers 815. In some instances, the pattern of DMRS tones carried by the set of subcarriers 815 in a PRG may be referred to as a DMRS pattern.

Each of the DMRS configurations 800-*a* and 800-*b* may be associated with two ports (e.g., the DMRS configurations 800-*a* and 800-*b* may be two-layer DMRS patterns). For example, the DMRS configuration 800-*a* may be for a two-layer DMRS pattern of DMRS tones across the set of subcarriers 815 and over the two ports 805-*a* and 805-*b* (e.g., a port #0 and a port #1 of the transmitting device). Additionally, the DMRS configuration 800-*n* may also be for a two-layer DMRS pattern of DMRS tones across the set of subcarriers 815 and over the two ports 805-*c* and 805-*d* (e.g., a port #0 and a port #1 of the transmitting device).

In some examples, a size of the PRGs (e.g., the PRGs 810-*a*, 810-*b*, 810-*c*, and/or 810-*d*) may be configured by a network node. For example, the network node may configure the size of the PRGs statically (e.g., as four resource blocks, or as a wideband PRG). In another example, the network node may configure candidate sizes of the PRGs via RRC signaling. For example, the network node may indicate that the size of the PRGs is selected from a set of one or more candidate sizes, where a set of candidate sizes may include, for example, four resource blocks, a wideband PRG, two resource blocks and a wideband PRG, or four resource blocks and a wideband PRG. Here, the network node may indicate (e.g., via DCI) the size of the PRGs from the set of candidate sizes.

In the example DMRS configurations 800-*a* and 800-*b*, the PRGs may be configured with a size of two resource blocks or four resource blocks (e.g., may not be configured as wideband PRGs). Accordingly, the transmitting device may apply a different precoder for each PRG.

Because the precoder may change from PRG to PRG in the example DMRS configurations 800-*a* and 800-*b*, a receiving device may not perform joint channel estimation (e.g., cross PRG channel estimation) as described herein. Instead, a receiving device may perform independent channel estimations for each PRG. That is, in the example of DMRS configuration 800-*a*, the receiving device may perform independent channel estimations for the PRG 810-*a* and the PRG 810-*b*. Additionally, in the example of DMRS configuration 800-*b*, the receiving device may perform independent channel estimations for the PRG 810-*c* and the PRG 810-*c*.

The DMRS configurations 800-*a* and 800-*b* may be example DMRS configurations where a PRG is associated with DMRS tones that are carried by frequency resources (e.g., subcarriers 815) in an adjacent PRG. That is, the DMRS configurations 800-*a* and 800-*b* may include a same quantity of DMRS tones as other DMRS patterns (e.g., as another DMRS pattern where a DMRS tone is carried by every other subcarrier 815), but a frequency pattern of the DMRS tones for a PRG (e.g., a PRG 810-*a*, 810-*b*, 810-*c*, and/or 810-*d*) may include one or more DMRS tones that cross a boundary of the PRG (e.g., that are carried by a subcarrier 815 within an adjacent PRG). In some cases, moving one or more edge DMRS tones (e.g., DMRS tones that are carried by subcarriers 815 that are near a boundary of the PRG) into adjacent PRGs may improve a channel estimation of that PRG (e.g., as compared to a DMRS pattern where all of the DMRS tones associated with a PRG are contained within the boundaries of that PRG). That is, moving the one or more edge DMRS tones into adjacent PRGs may decrease a reliance on extrapolation for performing channel estimation, thus improving an accuracy of the channel estimations. While illustrated with two ports, the DMRS configurations 800 may be extended to DMRS configurations with four ports.

In the example of DMRS configurations 800-*a* and 800-*b*, a transmitting device may apply an FD-OCC on a per-PRG basis. That is, the transmitting device may apply an FD-OCC on the DMRS tones associated with each PRG (e.g., independently of an FD-OCC applied to the DMRS tones associated with another PRG). For example, the transmitting device may apply a first FD-OCC to the DMRS tones associated with the PRG 810-*a* (e.g., the PRG 810-*a* DMRS tones), a second FD-OCC to the DMRS tones associated with the PRG 810-*b* (e.g., the PRG 810-*b* DMRS tones), a third FD-OCC to the DMRS tones associated with the PRG 810-*c* (e.g., the PRG 810-*c* DMRS tones), and a fourth FD-OCC to the DMRS tones associated with the PRG 810-*d* (e.g., the PRG 810-*d* DMRS tones). In some cases, if one FD-OCC is applied per PDSCH allocation, the two ports (e.g., the ports 805-*a* and 805-*b* and/or the ports 805-*c* and 805-*d*) may not be decoupled in the per PRG channel estimation processing.

In the example of DMRS configurations 800-*a* and 800-*b*, the DMRS tones associated with a PRG (e.g., including cross PRG tones that are associated with one PRG and carried by subcarriers 815 of an adjacent PRG) may be associated with a same precoder. That is, a network node may apply (and a UE may assume that the network node applied) a same precoder on each of the DMRS tones associated with a PRG (e.g., including cross PRG tones that are associated with one PRG and carried by subcarriers 815 of an adjacent PRG). For example, the transmitting device may apply a first precoder to the DMRS tones associated with the PRG 810-*a* (e.g., the PRG 810-*a* DMRS tones), a second precoder to the DMRS tones associated with the PRG 810-*b* (e.g., the PRG 810-*b* DMRS tones), a third precoder to the DMRS tones associated with the PRG 810-*c* (e.g., the PRG 810-*c* DMRS tones), and a fourth precoder to the DMRS tones associated with the PRG 810-*d* (e.g., the PRG 810-*d* DMRS tones). Accordingly, even in cases that a network node changes a precoder across adjacent PRGs, a UE or other receiving device may still perform interpolation for the PRG edge tone due to the cross PRG tones.

The receiving device may rely on the DMRS tones associated with each PRG to perform a channel estimation for that PRG. For example, the receiving device may perform a first channel estimation of the PRG 810-*a* based on the DMRS tones associated with the PRG 810-*a* (e.g., the PRG 810-*a* DMRS tones), a second channel estimation of the PRG 810-*b* based on the DMRS tones associated with the PRG 810-*b* (e.g., the PRG 810-*b* DMRS tones), a third channel estimation of the PRG 810-*c* based on the DMRS tones associated with the PRG 810-*c* (e.g., the PRG 810-*c* DMRS tones), and a fourth channel estimation of the PRG 810-*d* based on the DMRS tones associated with the PRG 810-*d* (e.g., the PRG 810-*d* DMRS tones).

In the example DMRS configuration 800-*a*, a quantity of every other DMRS tones may be moved into an adjacent PRG 810. For example, two DMRS tones may be moved from the PRG 810-*a* to be in PRG 810-*b*, and two DMRS may be moved from the PRG 810-*b* to the PRG 810-*a*. In other words, two DMRS tones associated with PRG 810-*a* may be carried by two subcarriers 815 in PRG 810-*b*, and two DMRS tones associated with PRG 810-*b* may be carried by two subcarriers 815 in PRG 810-*a*.

In the example DMRS configuration 800-*b*, a quantity of DMRS tones may be moved into an adjacent PRG 810. For example, two DMRS tones may be moved from the PRG 810-*c* to be in PRG 810-*d*, and two DMRS may be moved from the PRG 810-*d* to the PRG 810-*c*. In other words, two DMRS tones associated with PRG 810-*c* may be carried by two subcarriers 815 in PRG 810-*d*, and two DMRS tones associated with PRG 810-*d* may be carried by two subcarriers 815 in PRG 810-*c*.

A network node may select a pattern of DMRS tones (e.g., a DMRS pattern) based on a channel condition. For example, the network node may select a DMRS pattern associated with either DMRS configuration 800-*a* or 800-*b*, or another DMRS pattern not illustrated, based on the channel condition.

In one example, the receiving device may identify the DMRS pattern (e.g., associated with one of the DMRS configurations 800-*a* or 800-*b*) based on (e.g., in response) the transmitting device configuring the size of the PRGs. For instance, a network node may configure (e.g., via RRC signaling) a DMRS pattern for each candidate size of the PRGs (e.g., two resource blocks, four resource blocks, wideband). Then, the receiving device may identify the DMRS pattern (e.g., that corresponds to one of the DMRS configurations 800-*a* or 800-*b*) as the DMRS pattern that is configured (e.g., via DCI signaling) for the corresponding size of the PRGs. That is, in a case that the network node configured the DMRS pattern corresponding to the DMRS configuration 800-*a* for PRGs having a size of two resource blocks, if the network node configures the PRGs to have two resource blocks, the receiving device may identify that pattern of DMRS tones for the PRGs corresponds to the DMRS configuration 800-*a*. In some cases, the network node may configure DMRS patterns having a greater density of DMRS tones on one or more edges (e.g., boundaries) of the PRG than a density of DMRS on tones closer to a center frequency of the PRG for PRGs that are two resource blocks or four resource blocks. Additionally, the network node may configure DMRS patterns having a consistent density of DMRS tones across the PRG (e.g., where DMRS tones occur every n subcarriers throughout the PRG) for PRGs that are wideband.

In another example, the transmitting device may transmit explicit signaling, to the receiving device, indicating a DMRS pattern for a set of PRGs. For instance, the network node may configure (e.g., via RRC signaling) multiple DMRS patterns (e.g., corresponding to the DMRS configurations 800-*a* and 800-*b*) for each PRG candidate size (e.g., for two resource block PRGs, for four resource block PRGs, for wideband PRGs). Additionally, the network node may transmit signaling (e.g., via an L1 signal) indicating a DMRS pattern for the PRG from the multiple DMRS patterns configured for that PRG size. In some cases, the network node may indicate the size of the PRG to the receiving device via RRC signaling or via a combination of RRC and DCI signaling. Additionally, a DCI codepoint may be used to signal which DMRS pattern (e.g., associated with the indicated PRG size) for the receiving device to use for channel estimation.

Figures 9A, 9B:
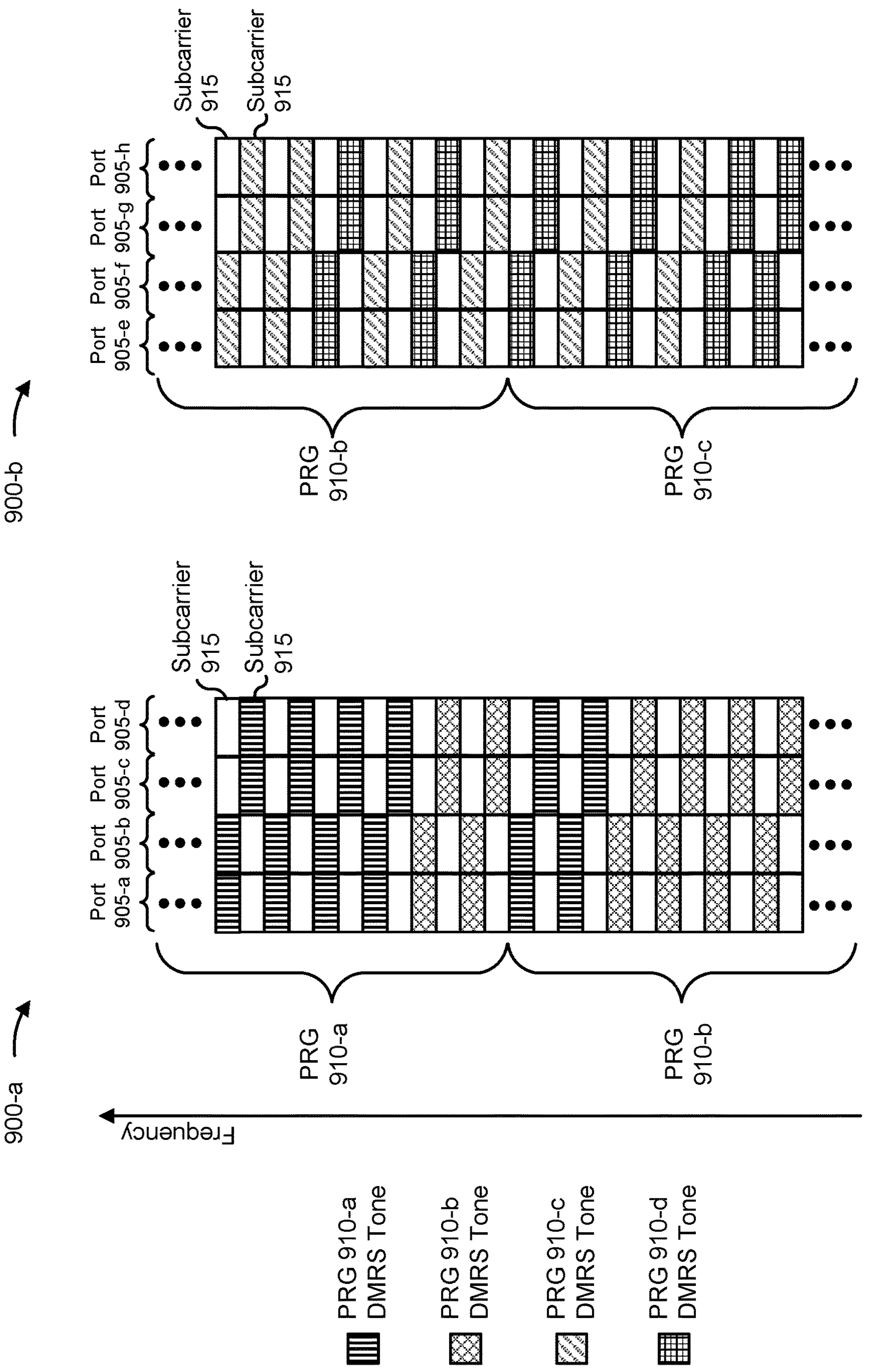

FIGS. 9A and 9B are diagrams illustrating example DMRS configurations 900, in accordance with aspects of the present disclosure. The example DMRS configurations 900 may be utilized by a transmitting device, such as a network node 110 or a UE 120, to transmit a DMRS signal via a radio channel. For example, a network node may utilize DMRS configuration 900-*a* or DMRS configuration 900-*b* to transmit a DMRS signal to a UE 120 via a PDSCH.

The DMRS configurations 900-*a* and 900-*b* may include aspects of the DMRS configurations 800-*a* and 800-*b* described with reference to FIGS. 8A and 8B. In particular, the DMRS configurations 900-*a* and 900-*b* may also illustrate example DMRS configurations where a PRG is associated with DMRS tones that are carried by frequency resources (e.g., subcarriers 915) in an adjacent PRG. But while FIGS. 8A and 8B illustrate example DMRS configurations associated with two ports, FIGS. 9A and 9B illustrate example DMRS configurations associated with four ports. That is, the DMRS configuration 900-*a* may be for a four-layer DMRS pattern, and associated with four ports: port 905-*a*, 905-*b*, 905-*c* and 905-*d*. Further, the DMRS configuration 900-*b* may be for a four-layer DMRS pattern, and associated with four ports: port 905-*e*, 905-*f*, 905-*g*, and 905-*h*.

The DMRS configurations 900-*a* and 900-*b* may include DMRS patterns with an adjusted comb offset for the second two ports as compared to the first two ports. For example, the DMRS pattern associated with the ports 905-*a* and 905-*b* may be associated with one comb offset, and the DMRS pattern associated with the ports 905-*c* and 905-*d* may be associated with a different comb offset. Additionally, the DMRS pattern associated with the ports 905-*e* and 905-*f* may be associated with one comb offset, and the DMRS pattern associated with the ports 905-*g* and 905-*h* may be associated with a different comb offset.

As described above with reference to FIG. 9, a receiving device may rely on the DMRS tones associated with each PRG to perform a channel estimation for that PRG. For example, the receiving device may perform a first channel estimation of the PRG 910-*a* based on the DMRS tones associated with the PRG 910-*a* (e.g., the PRG 910-*a* DMRS tones), a second channel estimation of the PRG 910-*b* based on the DMRS tones associated with the PRG 910-*b* (e.g., the PRG 910-*b* DMRS tones), a third channel estimation of the PRG 910-*c* based on the DMRS tones associated with the PRG 910-*c* (e.g., the PRG 910-*c* DMRS tones), and a fourth channel estimation of the PRG 910-*d* based on the DMRS tones associated with the PRG 910-*d* (e.g., the PRG 910-*d* DMRS tones).

Figure 10:
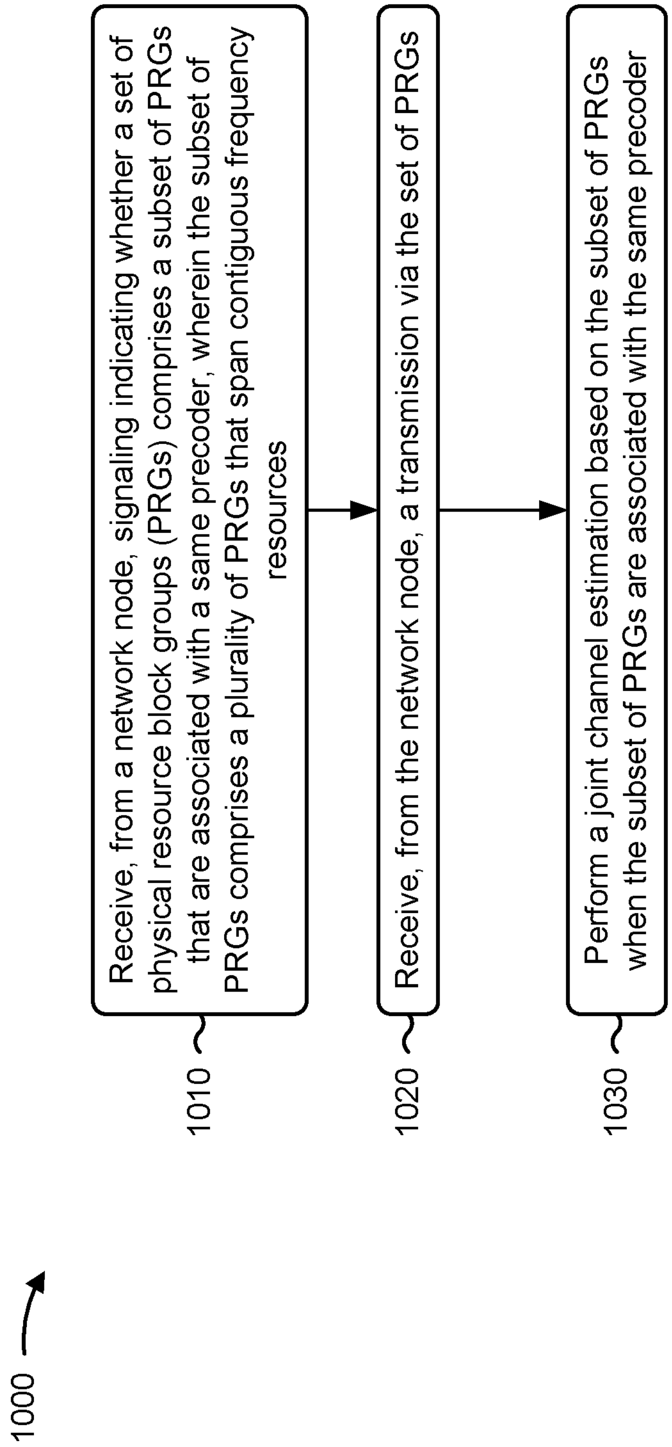
FIG. 10 is a diagram illustrating example processes performed, for example, at a UE or an apparatus of a UE, in accordance with the present disclosure.

FIG. 10 is a diagram illustrating an example process 1000 performed, for example, at a UE or an apparatus of a UE, in accordance with the present disclosure. Example process 1000 is an example where the apparatus or the UE (e.g., UE 120) performs operations associated with channel estimation based on a precoder indication.

As shown in FIG. 10, in some aspects, process 1000 may include receiving, from a network node, signaling indicating whether a set of PRGs comprises a subset of PRGs that are associated with a same precoder, wherein the subset of PRGs comprises a plurality of PRGs that span contiguous frequency resources (block 1010). For example, the UE (e.g., using reception component 1302 and/or communication manager 1306, depicted in FIG. 13) may receive, from a network node, signaling indicating whether a set of PRGs comprises a subset of PRGs that are associated with a same precoder, wherein the subset of PRGs comprises a plurality of PRGs that span contiguous frequency resources, as described above. In some aspects, the subset of PRGs comprises a plurality of PRGs that span contiguous frequency resources.

As further shown in FIG. 10, in some aspects, process 1000 may include receiving, from the network node, a transmission via the set of PRGs (block 1020). For example, the UE (e.g., using reception component 1302 and/or communication manager 1306, depicted in FIG. 13) may receive, from the network node, a transmission via the set of PRGs, as described above.

As further shown in FIG. 10, in some aspects, process 1000 may include performing a joint channel estimation based on the subset of PRGs when the subset of PRGs are associated with the same precoder (block 1030). For example, the UE (e.g., using communication manager 1306, depicted in FIG. 13) may perform the joint channel estimation based on the subset of PRGs when the subset of PRGs are associated with the same precoder, as described above.

Process 1000 may include additional aspects, such as any single aspect or any combination of aspects described below and/or in connection with one or more other processes described elsewhere herein.

In a first aspect, process 1000 includes communicating with the network node based at least in part on a result of the joint channel estimation.

In a second aspect, the signaling comprises an indication of a quantity of PRGs that are in the subset of PRGs.

In a third aspect, the signaling further indicates that the set of PRGs comprises a second subset of PRGs that are associated with a second precoder, and performing the channel estimation further comprises performing a second joint channel estimation of the second subset of PRGs in response to the second subset of PRGs being associated with the second precoder.

In a fourth aspect, the signaling comprises a first indication of a first quantity of PRGs that are in the subset of PRGs and a second indication of a second quantity of PRGs that are in the second subset of PRGs.

In a fifth aspect, the signaling indicates a likelihood of the set of PRGs comprising the subset of PRGs that are associated with the same precoder.

In a sixth aspect, process 1000 includes determining that the set of PRGs comprises the subset of PRGs that are associated with the same precoder in response to the signaling indicating the likelihood and in response to receiving the transmission.

In a seventh aspect, process 1000 includes determining that the set of PRGs does not comprise the subset of PRGs that are associated with the same precoder in response to the signaling indicating the likelihood and in response to receiving the transmission and refraining from performing a joint channel estimation based on the set of PRGs not comprising the subset of PRGs that are associated with the same precoder.

In an eighth aspect, process 1000 includes transmitting a reference signal to the network node, wherein receiving the signaling indicating the likelihood of the set of PRGs comprising the subset of PRGs that are associated with the same precoder is in response to transmitting the reference signal.

In a ninth aspect, process 1000 includes transmitting, to the network node, a channel state information report comprising a plurality of PMIs, wherein each PMI of the plurality of PMIs is associated with a respective subset of PRGs from the set of PRGs, and wherein the signaling indicates whether the set of PRGs comprise the subset of PRGs that are associated with the same precoder by indicating whether the respective subsets of PRGs from the set of PRGs are associated with a precoder that corresponds to one of the plurality of PMIs.

In a tenth aspect, the signaling indicates that the set of PRGs comprise the subset of PRGs that are associated with the same precoder by indicating that at least one subset of the respective subsets of PRGs is associated with the precoder that corresponds to a PMI of the plurality of PMIs.

In an eleventh aspect, process 1000 includes transmitting, to the network node, a capability of the UE to perform joint channel estimation of multiple PRGs, wherein receiving the signaling is in response to transmitting the capability to the network node.

In a twelfth aspect, the capability of the UE comprises an indication of a channel estimation algorithm associated with performing the channel estimation, one or more parameters associated with performing the channel estimation, or a combination thereof.

In a thirteenth aspect, process 1000 includes the signaling indicates that the set of PRGs does not comprise the subset of PRGs that are associated with the same precoder, and performing the channel estimation comprises refraining from performing the joint channel estimation when the set of PRGs does not comprise the subset of PRGs that are associated with the same precoder.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
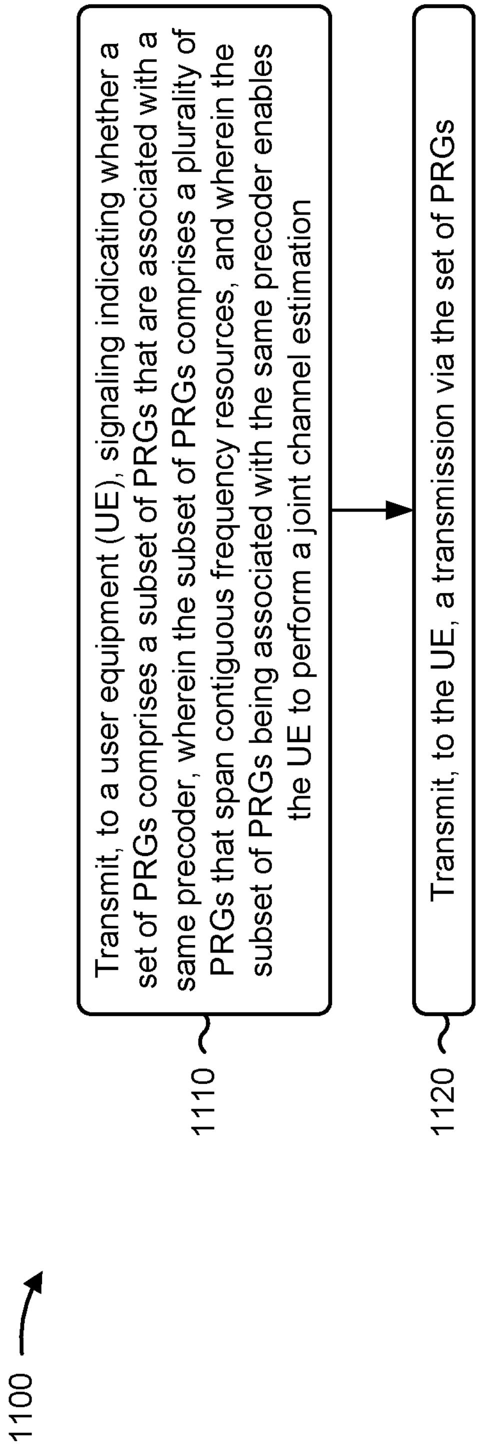
FIG. 11 is a diagram illustrating an example process performed, for example, at a network node or an apparatus of a network node, in accordance with the present disclosure.

FIG. 11 is a diagram illustrating an example process 1100 performed, for example, at a network node or an apparatus of a network node, in accordance with the present disclosure. Example process 1100 is an example where the apparatus or the network node (e.g., network node 110) performs operations associated with channel estimation based on a precoder indication.

As shown in FIG. 11, in some aspects, process 1100 may include transmitting, to a UE, signaling indicating whether a set of PRGs comprises a subset of PRGs that are associated with a same precoder, wherein the subset of PRGs comprises a plurality of PRGs that span contiguous frequency resources, and wherein the subset of PRGs being associated with the same precoder enables the UE to perform a joint channel estimation (block 1110). For example, the network node (e.g., using transmission component 1404 and/or communication manager 1406, depicted in FIG. 14) may transmit, to a UE, signaling indicating whether a set of PRGs comprises a subset of PRGs that are associated with a same precoder, wherein the subset of PRGs comprises a plurality of PRGs that span contiguous frequency resources, and wherein the subset of PRGs being associated with the same precoder enables the UE to perform a joint channel estimation, as described above. In some aspects, the subset of PRGs comprises a plurality of PRGs that span contiguous frequency resources.

As further shown in FIG. 11, in some aspects, process 1100 may include transmitting, to the UE, a transmission via the set of PRGs (block 1120). For example, the network node (e.g., using transmission component 1404 and/or communication manager 1406, depicted in FIG. 14) may transmit, to the UE, a transmission via the set of PRGs, as described above.

Process 1100 may include additional aspects, such as any single aspect or any combination of aspects described below and/or in connection with one or more other processes described elsewhere herein.

In a first aspect, the process 1100 may include communicating with the UE based at least in part on a result of the joint channel estimation.

In a second aspect, the signaling comprises an indication of a quantity of PRGs that are in the subset of PRGs.

In a third aspect, the signaling further indicates that the set of PRGs comprises a second subset of PRGs that are associated with a second precoder, and the second subset of PRGs comprising the second subset of PRGs that are associated with the second precoder enables the UE to perform a second joint channel estimation.

In a fourth aspect, the signaling comprises a first indication of a first quantity of PRGs that are in the subset of PRGs and a second indication of a second quantity of PRGs that are in the second subset of PRGs.

In a fifth aspect, the signaling indicates a likelihood of the set of PRGs comprising the subset of PRGs that are associated with the same precoder.

In a sixth aspect, process 1100 includes receiving a reference signal from the UE, wherein transmitting the signaling indicating the likelihood of the set of PRGs comprising the subset of PRGs that are associated with the same precoder is in response to receiving the reference signal.

In a seventh aspect, process 1100 includes receiving, from the UE, a channel state information report comprising a plurality of PMIs, wherein each PMI of the plurality of PMIs is associated with a respective subset of PRGs from the set of PRGs, and wherein the signaling indicates whether the set of PRGs comprise the subset of PRGs that are associated with the same precoder by indicating whether the respective subsets of PRGs from the set of PRGs are associated with a precoder that corresponds to one of the plurality of PMIs.

In an eighth aspect, the signaling indicates that the set of PRGs comprises the subset of PRGs that are associated with the same precoder by indicating that at least one subset of the respective subsets of PRGs is associated with the precoder that corresponds to a PMI of the plurality of PMIs.

In a ninth aspect, process 1100 includes receiving, from the UE, a capability of the UE to perform joint channel estimation of multiple PRGs, wherein transmitting the signaling is in response to receiving the capability to the network node.

In a tenth aspect, the capability of the UE comprises an indication of a channel estimation algorithm associated with performing the channel estimation, one or more parameters associated with performing the channel estimation, or a combination thereof.

In an eleventh aspect, the signaling indicates that the set of PRGs does not comprise the subset of PRGs that are associated with the same precoder.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
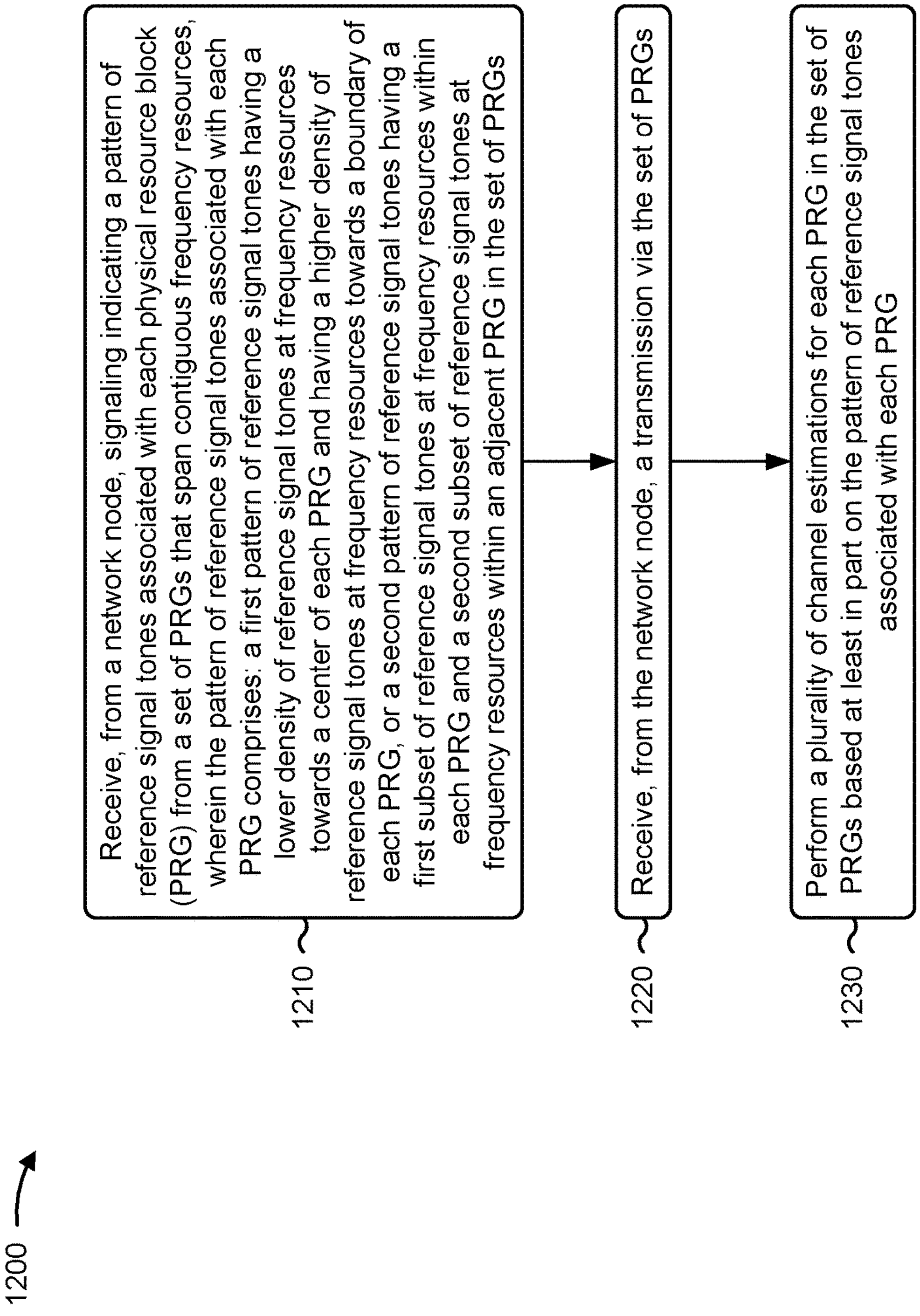
FIG. 12 is a diagram illustrating example processes performed, for example, at a UE or an apparatus of a UE, in accordance with the present disclosure.

FIG. 12 is a diagram illustrating an example process 1200 performed, for example, at a UE or an apparatus of a UE, in accordance with the present disclosure. Example process 1200 is an example where the apparatus or the UE (e.g., UE 120) performs operations associated with channel estimation based on a precoder indication.

As shown in FIG. 12, in some aspects, process 1200 may include receiving, from a network node, signaling indicating a pattern of reference signal tones associated with each PRG from a set of PRGs that span contiguous frequency resources, wherein the pattern of reference signal tones associated with each PRG comprises: a first pattern of reference signal tones having a lower density of reference signal tones at frequency resources towards a center of each PRG and having a higher density of reference signal tones at frequency resources towards a boundary of each PRG, or a second pattern of reference signal tones having a first subset of reference signal tones at frequency resources within each PRG and a second subset of reference signal tones at frequency resources within an adjacent PRG in the set of PRGs (block 1210). For example, the UE (e.g., using reception component 1302 and/or communication manager 1306, depicted in FIG. 13) may receive, from a network node, signaling indicating the pattern of reference signal tones associated with each PRG from a set of PRGs that span contiguous frequency resources, as described above. In some aspects, the pattern of reference signal tones associated with each PRG comprises: a first pattern of reference signal tones having a lower density of reference signal tones at frequency resources towards a center of each PRG and having a higher density of reference signal tones at frequency resources towards a boundary of each PRG, or a second pattern of reference signal tones having a first subset of reference signal tones at frequency resources within each PRG and a second subset of reference signal tones at frequency resources within an adjacent PRG in the set of PRGs.

As further shown in FIG. 12, in some aspects, process 1200 may include receiving, from the network node, a transmission via the set of PRGs (block 1220). For example, the UE (e.g., using reception component 1302 and/or communication manager 1306, depicted in FIG. 13) may receive, from the network node, a transmission via the set of PRGs, as described above.

As further shown in FIG. 12, in some aspects, process 1200 may include performing a plurality of channel estimations for each PRG in the set of PRGs based at least in part on the pattern of reference signal tones associated with each PRG (block 1230). For example, the UE (e.g., using communication manager 1306, depicted in FIG. 13) may perform the plurality of channel estimations for each PRG in the set of PRGs based at least in part on the pattern of reference signal tones associated with each PRG, as described above.

Figure 13:
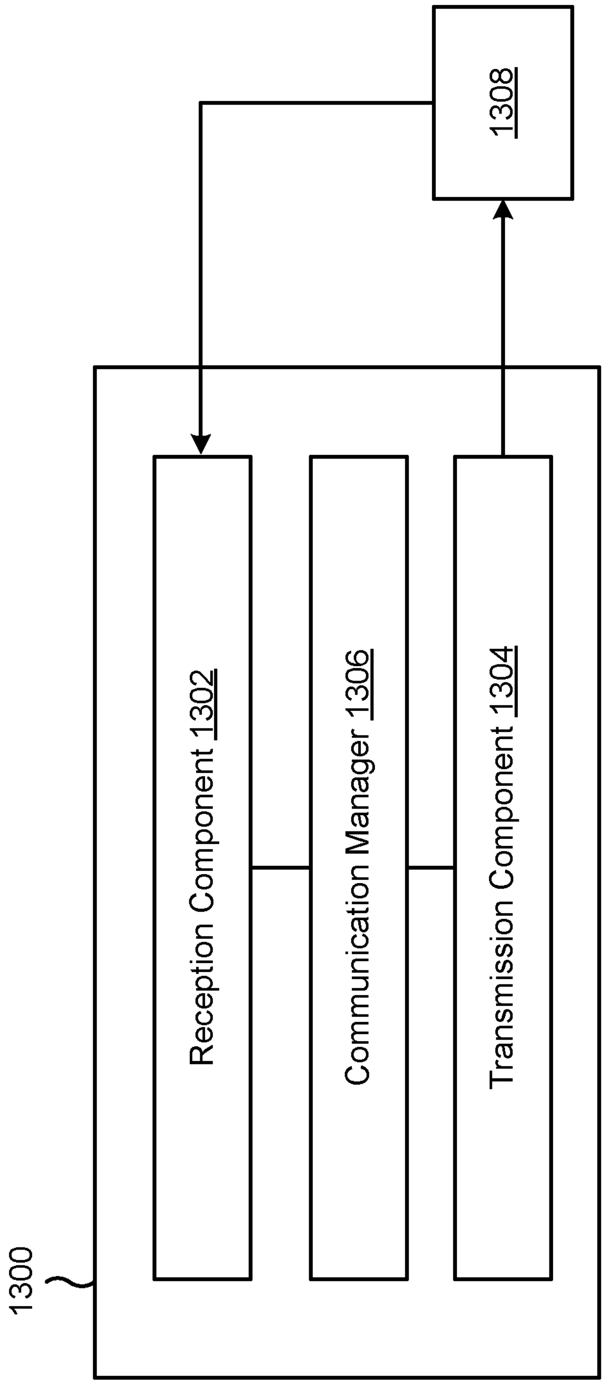
FIGS. 13 and 14 are diagrams of example apparatuses for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 140 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 4-9B. Additionally, or alternatively, the apparatus 1300 may be configured to perform one or more processes described herein, such as processes 1000 of FIG. 10 or processes 1200 of FIG. 12. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1304 may be co-located with the reception component 1302 in one or more transceivers.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The reception component 1302 may receive, from a network node, signaling indicating whether a set of PRGs comprises a subset of PRGs that are associated with a same precoder wherein the subset of PRGs comprises a plurality of PRGs that span contiguous frequency resources. The reception component 1302 may receive, from the network node, a transmission via the set of PRGs. The reception component 1302 and/or the transmission component 1304 may communicate with the network node based at least in part on a result of the joint channel estimation.

The transmission component 1304 may transmit a reference signal to the network node, wherein receiving the signaling indicating the likelihood of the set of PRGs comprising the subset of PRGs that are associated with the same precoder is in response to transmitting the reference signal.

The transmission component 1304 may transmit, to the network node, a channel state information report comprising a plurality of PMIs, wherein each PMI of the plurality of PMIs is associated with a respective subset of PRGs from the set of PRGs, and wherein the signaling indicates whether the set of PRGs comprise the subset of PRGs that are associated with the same precoder by indicating whether the respective subsets of PRGs from the set of PRGs are associated with a precoder that corresponds to one of the plurality of PMIs.

The transmission component 1304 may transmit, to the network node, a capability of the UE to perform joint channel estimation of multiple PRGs, wherein receiving the signaling is in response to transmitting the capability to the network node.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
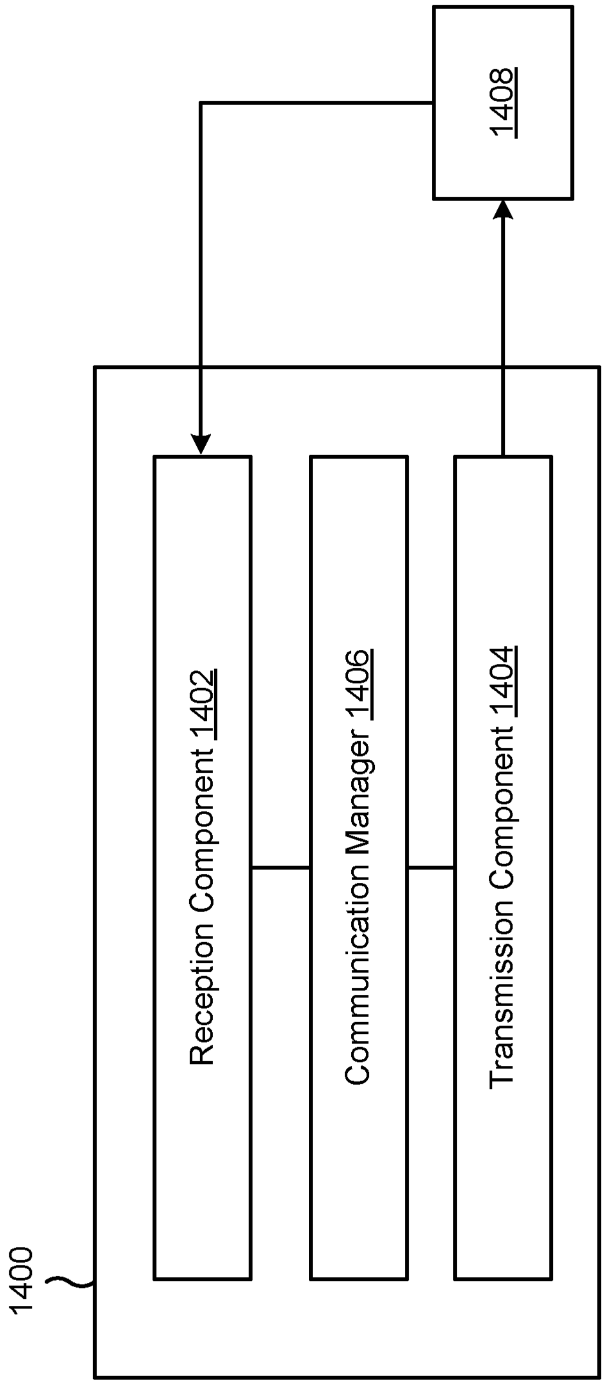

FIG. 14 is a diagram of an example apparatus 1400 for wireless communication, in accordance with the present disclosure. The apparatus 1400 may be a network node, or a network node may include the apparatus 1400. In some aspects, the apparatus 1400 includes a reception component 1402, a transmission component 1404, and/or a communication manager 1406, which may be in communication with one another (for example, via one or more buses and/or one or more other components). In some aspects, the communication manager 1406 is the communication manager 150 described in connection with FIG. 1. As shown, the apparatus 1400 may communicate with another apparatus 1408, such as a UE or a network node (such as a CU, a DU, an RU, or a base station), using the reception component 1402 and the transmission component 1404.

In some aspects, the apparatus 1400 may be configured to perform one or more operations described herein in connection with FIGS. 4-9B. Additionally, or alternatively, the apparatus 1400 may be configured to perform one or more processes described herein, such as process 1100 of FIG. 11. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1402 and/or the transmission component 1404 may include or may be included in a network interface. The network interface may be configured to obtain and/or output signals for the apparatus 1400 via one or more communications links, such as a backhaul link, a midhaul link, and/or a fronthaul link.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1404 may be co-located with the reception component 1402 in one or more transceivers.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

The transmission component 1404 may transmit, to a UE, signaling indicating whether a set of PRGs comprises a subset of PRGs that are associated with a same precoder, wherein the subset of PRGs comprises a plurality of PRGs that span contiguous frequency resources, and wherein the subset of PRGs being associated with the same precoder enables the UE to perform a joint channel estimation. The transmission component 1404 may transmit, to the UE, a transmission via the set of PRGs. The reception component 1402 and/or the transmission component 1404 may communicate with the UE based at least in part on a result of the joint channel estimation.

The reception component 1402 may receive a reference signal from the UE, wherein transmitting the signaling indicating the likelihood of the set of PRGs comprising the subset of PRGs that are associated with the same precoder is in response to receiving the reference signal.

The reception component 1402 may receive, from the UE, a channel state information report comprising a plurality of PMIs, wherein each PMI of the plurality of PMIs is associated with a respective subset of PRGs from the set of PRGs, and wherein the signaling indicates whether the set of PRGs comprise the subset of PRGs that are associated with the same precoder by indicating whether the respective subsets of PRGs from the set of PRGs are associated with a precoder that corresponds to one of the plurality of PMIs.

The reception component 1402 may receive, from the UE, a capability of the UE to perform joint channel estimation of multiple PRGs, wherein transmitting the signaling is in response to receiving the capability to the network node.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a UE, comprising: receiving, from a network node, signaling indicating whether a set of PRGs comprises a subset of PRGs that are associated with a same precoder, wherein the subset of PRGs comprises a plurality of PRGs that span contiguous frequency resources; receiving, from the network node, a transmission via the set of PRGs; and performing a joint channel estimation based on the subset of PRGs when the subset of PRGs are associated with the same precoder.

Aspect 2: The method of Aspect 1, further comprising: communicating with the network node based at least in part on a result of the joint channel estimation.

Aspect 3: The method of Aspect 2, wherein the signaling comprises an indication of a quantity of PRGs that are in the subset of PRGs.

Aspect 4: The method of Aspect 2, wherein: the signaling further indicates that the set of PRGs comprises a second subset of PRGs that are associated with a second precoder; and performing the channel estimation further comprises: performing a second joint channel estimation of the second subset of PRGs in response to the second subset of PRGs being associated with the second precoder.

Aspect 5: The method of Aspect 4, wherein the signaling comprises a first indication of a first quantity of PRGs that are in the subset of PRGs and a second indication of a second quantity of PRGs that are in the second subset of PRGs.

Aspect 6: The method of any of Aspects 1-5, wherein the signaling indicates a likelihood of the set of PRGs comprising the subset of PRGs that are associated with the same precoder.

Aspect 7: The method of Aspect 6, further comprising: determining that the set of PRGs comprises the subset of PRGs that are associated with the same precoder in response to the signaling indicating the likelihood and in response to receiving the transmission.

Aspect 8: The method of Aspect 6, further comprising: determining that the set of PRGs does not comprise the subset of PRGs that are associated with the same precoder in response to the signaling indicating the likelihood and in response to receiving the transmission; and refraining from performing a joint channel estimation based on the set of PRGs not comprising the subset of PRGs that are associated with the same precoder.

Aspect 9: The method of Aspect 6, further comprising: transmitting a reference signal to the network node, wherein receiving the signaling indicating the likelihood of the set of PRGs comprising the subset of PRGs that are associated with the same precoder is in response to transmitting the reference signal.

Aspect 10: The method of any of Aspects 1-9, further comprising: transmitting, to the network node, a channel state information report comprising a plurality of PMIs, wherein each PMI of the plurality of PMIs is associated with a respective subset of PRGs from the set of PRGs, and wherein the signaling indicates whether the set of PRGs comprise the subset of PRGs that are associated with the same precoder by indicating whether the respective subsets of PRGs from the set of PRGs are associated with a precoder that corresponds to one of the plurality of PMIs.

Aspect 11: The method of Aspect 10, wherein: the signaling indicates that the set of PRGs comprise the subset of PRGs that are associated with the same precoder by indicating that at least one subset of the respective subsets of PRGs is associated with the precoder that corresponds to a PMI of the plurality of PMIs.

Aspect 12: The method of any of Aspects 1-11, further comprising: transmitting, to the network node, a capability of the UE to perform joint channel estimation of multiple PRGs, wherein receiving the signaling is in response to transmitting the capability to the network node.

Aspect 13: The method of Aspect 12, wherein the capability of the UE comprises an indication of a channel estimation algorithm associated with performing the channel estimation, one or more parameters associated with performing the channel estimation, or a combination thereof.

Aspect 14: The method of any of Aspects 1-13, wherein: the signaling indicates that the set of PRGs does not comprise the subset of PRGs that are associated with the same precoder; and performing the channel estimation comprises: refraining from performing the joint channel estimation when the set of PRGs does not comprise the subset of PRGs that are associated with the same precoder.

Aspect 15: A method of wireless communication performed by a network node, comprising: transmitting, to a UE, signaling indicating whether a set of PRGs comprises a subset of PRGs that are associated with a same precoder, wherein the subset of PRGs comprises a plurality of PRGs that span contiguous frequency resources, and wherein the subset of PRGs being associated with the same precoder enables the UE to perform a joint channel estimation; and transmitting, to the UE, a transmission via the set of PRGs.

Aspect 16: The method of Aspect 15, further comprising: communicating with the UE based at least in part on a result of the joint channel estimation.

Aspect 17: The method of Aspect 16, wherein the signaling comprises an indication of a quantity of PRGs that are in the subset of PRGs.

Aspect 18: The method of Aspect 16, wherein: the signaling further indicates that the set of PRGs comprises a second subset of PRGs that are associated with a second precoder; and the second subset of PRGs comprising the second subset of PRGs that are associated with the second precoder enables the UE to perform a second joint channel estimation.

Aspect 19: The method of Aspect 18, wherein the signaling comprises a first indication of a first quantity of PRGs that are in the subset of PRGs and a second indication of a second quantity of PRGs that are in the second subset of PRGs.

Aspect 20: The method of any of Aspects 15-19, wherein the signaling indicates a likelihood of the set of PRGs comprising the subset of PRGs that are associated with the same precoder.

Aspect 21: The method of Aspect 20, further comprising: receiving a reference signal from the UE, wherein transmitting the signaling indicating the likelihood of the set of PRGs comprising the subset of PRGs that are associated with the same precoder is in response to receiving the reference signal.

Aspect 22: The method of any of Aspects 15-21, further comprising: receiving, from the UE, a channel state information report comprising a plurality of PMIs, wherein each PMI of the plurality of PMIs is associated with a respective subset of PRGs from the set of PRGs, and wherein the signaling indicates whether the set of PRGs comprise the subset of PRGs that are associated with the same precoder by indicating whether the respective subsets of PRGs from the set of PRGs are associated with a precoder that corresponds to one of the plurality of PMIs.

Aspect 23: The method of Aspect 22, wherein the signaling indicates that the set of PRGs comprise the subset of PRGs that are associated with the same precoder by indicating that at least one subset of the respective subsets of PRGs is associated with the precoder that corresponds to a PMI of the plurality of PMIs.

Aspect 24: The method of any of Aspects 15-23, further comprising: receiving, from the UE, a capability of the UE to perform joint channel estimation of multiple PRGs, wherein transmitting the signaling is in response to receiving the capability to the network node.

Aspect 25: The method of Aspect 24, wherein the capability of the UE comprises an indication of a channel estimation algorithm associated with performing the channel estimation, one or more parameters associated with performing the channel estimation, or a combination thereof.

Aspect 26: The method of any of Aspects 15-25, wherein the signaling indicates that the set of PRGs does not comprise the subset of PRGs that are associated with the same precoder.

Aspect 27: A method of wireless communication performed by a UE, comprising: receiving, from a network node, signaling indicating a pattern of reference signal tones associated with each PRG from a set of PRGs that span contiguous frequency resources, wherein the pattern of reference signal tones associated with each PRG comprises: a first pattern of reference signal tones having a lower density of reference signal tones at frequency resources towards a center of each PRG and having a higher density of reference signal tones at frequency resources towards a boundary of each PRG, or a second pattern of reference signal tones having a first subset of reference signal tones at frequency resources within each PRG and a second subset of reference signal tones at frequency resources within an adjacent PRG in the set of PRGs; and receiving, from the network node, a transmission via the set of PRGs; and performing a plurality of channel estimations for each PRG in the set of PRGs based at least in part on the pattern of reference signal tones associated with each PRG.

Aspect 28: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-27.

Aspect 29: An apparatus for wireless communication at a device, the apparatus comprising one or more memories and one or more processors coupled to the one or more memories, the one or more processors configured to cause the device to perform the method of one or more of Aspects 1-27.

Aspect 30: An apparatus for wireless communication, the apparatus comprising at least one means for performing the method of one or more of Aspects 1-27.

Aspect 31: A non-transitory computer-readable medium storing code for wireless communication, the code comprising instructions executable by one or more processors to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

Aspect 33: A device for wireless communication, the device comprising a processing system that includes one or more processors and one or more memories coupled with the one or more processors, the processing system configured to cause the device to perform the method of one or more of Aspects 1-27.

Aspect 34: An apparatus for wireless communication at a device, the apparatus comprising one or more memories and one or more processors coupled to the one or more memories, the one or more processors individually or collectively configured to cause the device to perform the method of one or more of Aspects 1-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a user equipment (UE), comprising:

one or more memories; and one or more processors, coupled to the one or more memories, configured to cause the UE to:

transmit a reference signal to a network node;

receive, from the network node and in response to the transmission of the reference signal, signaling indicating a likelihood of a set of physical resource block groups (PRGs) comprising a subset of PRGs that are associated with a same precoder, wherein the subset of PRGs comprises a plurality of PRGs that span contiguous frequency resources;

receive, from the network node, a transmission via the set of PRGs; and perform a joint channel estimation based on the subset of PRGs when the subset of PRGs are associated with the same precoder.

2. The apparatus of claim 1, wherein the one or more processors are further configured to cause the UE to:

communicate with the network node based at least in part on a result of the joint channel estimation.

3. The apparatus of claim 2, wherein the signaling comprises an indication of a quantity of PRGs that are in the subset of PRGs.

4. The apparatus of claim 2, wherein:

the signaling further indicates that the set of PRGs comprises a second subset of PRGs that are associated with a second precoder; and the one or more processors, to cause the UE to perform the channel estimation, are configured to cause the UE to:

perform a second joint channel estimation of the second subset of PRGs in response to the second subset of PRGs being associated with the second precoder.

5. The apparatus of claim 4, wherein the signaling comprises a first indication of a first quantity of PRGs that are in the subset of PRGs and a second indication of a second quantity of PRGs that are in the second subset of PRGs.

6. The apparatus of claim 1, wherein the one or more processors are further configured to cause the UE to:

determine that the set of PRGs comprises the subset of PRGs that are associated with the same precoder in response to the signaling indicating the likelihood and in response to receiving the transmission.

7. The apparatus of claim 1, wherein the one or more processors are further configured to cause the UE to:

determine that the set of PRGs does not comprise the subset of PRGs that are associated with the same precoder in response to the signaling indicating the likelihood and in response to receiving the transmission via the set of PRGs; and refrain from performing a joint channel estimation based on the set of PRGs not comprising the subset of PRGs that are associated with the same precoder.

8. The apparatus of claim 1, wherein the one or more processors are further configured to cause the UE to:

transmit, to the network node, a channel state information report comprising a plurality of precoding matrix indicators (PMIs), wherein each PMI of the plurality of PMIs is associated with a respective subset of PRGs from the set of PRGs, and wherein the signaling indicates whether the set of PRGs comprise the subset of PRGs that are associated with the same precoder by indicating whether the respective subsets of PRGs from the set of PRGs are associated with a precoder that corresponds to one of the plurality of PMIs.

9. The apparatus of claim 8, wherein the signaling indicates that the set of PRGs comprise the subset of PRGs that are associated with the same precoder by indicating that at least one subset of the respective subsets of PRGs is associated with the precoder that corresponds to a PMI of the plurality of PMIs.

10. The apparatus of claim 1, wherein the one or more processors are further configured to cause the UE to:

transmit, to the network node, a capability of the UE to perform a joint channel estimation of multiple PRGs, wherein receiving the signaling is in response to transmitting the capability to the network node.

11. The apparatus of claim 10 wherein the capability of the UE comprises an indication of a channel estimation algorithm associated with performing the channel estimation, one or more parameters associated with performing the channel estimation, or a combination thereof.

12. The apparatus of claim 1, wherein:

the signaling indicates that the set of PRGs does not comprise the subset of PRGs that are associated with the same precoder; and the one or more processors, to cause the UE to perform the channel estimation, are configured to cause the UE to:

refrain from performing the joint channel estimation when the set of PRGs does not comprise the subset of PRGs that are associated with the same precoder.

13. An apparatus for wireless communication at a network node, comprising:

one or more memories; and one or more processors, coupled to the one or more memories, configured to cause the network node to:

receive a reference signal from a user equipment (UE);

transmit, to the UE and in response to the reception of the reference signal, signaling indicating a likelihood of a set of physical resource block groups (PRGs) comprising a subset of PRGs that are associated with a same precoder, wherein the subset of PRGs comprises a plurality of PRGs that span contiguous frequency resources, and wherein the subset of PRGs being associated with the same precoder enables the UE to perform a joint channel estimation; and transmit, to the UE, a transmission via the set of PRGs.

14. The apparatus of claim 13, wherein the one or more processors are further configured to cause the network node to:

communicate with the UE based at least in part on a result of the joint channel estimation.

15. The apparatus of claim 14, wherein:

the signaling further indicates that the set of PRGs comprises a second subset of PRGs that are associated with a second precoder; and the second subset of PRGs comprising the second subset of PRGs that are associated with the second precoder enables the UE to perform a second joint channel estimation.

16. The apparatus of claim 15, wherein the signaling comprises a first indication of a first quantity of PRGs that are in the subset of PRGs and a second indication of a second quantity of PRGs that are in the second subset of PRGs.

17. The apparatus of claim 13, wherein the signaling comprises an indication of a quantity of PRGs that are in the subset of PRGs.

18. The apparatus of claim 13, wherein the one or more processors are further configured to cause the network node to:

receive, from the UE, a channel state information report comprising a plurality of precoding matrix indicators (PMIs), wherein each PMI of the plurality of PMIs is associated with a respective subset of PRGs from the set of PRGs, and wherein the signaling indicates whether the set of PRGs comprise the subset of PRGs that are associated with the same precoder by indicating whether the respective subsets of PRGs from the set of PRGs are associated with a precoder that corresponds to one of the plurality of PMIs.

19. The apparatus of claim 18, wherein the signaling indicates that the set of PRGs comprise the subset of PRGs that are associated with the same precoder by indicating that at least one subset of the respective subsets of PRGs is associated with the precoder that corresponds to a PMI of the plurality of PMIs.

20. The apparatus of claim 13, wherein the one or more processors are further configured to cause the network node to:

receive, from the UE, a capability of the UE to perform joint channel estimation of multiple PRGs, wherein transmitting the signaling is in response to receiving the capability to the network node.

21. The apparatus of claim 20, wherein the capability of the UE comprises an indication of a channel estimation algorithm associated with performing the channel estimation, one or more parameters associated with performing the channel estimation, or a combination thereof.

22. The apparatus of claim 13, wherein the signaling indicates that the set of PRGs does not comprise the subset of PRGs that are associated with the same precoder.

23. A method of wireless communication performed by a user equipment (UE), comprising:

transmitting a reference signal to a network node;

receiving, from the network node and in response to transmitting the reference signal, signaling indicating a likelihood of a set of physical resource block groups (PRGs) comprising a subset of PRGs that are associated with a same precoder, wherein the subset of PRGs comprises a plurality of PRGs that span contiguous frequency resources;

receiving, from the network node, a transmission via the set of PRGs; and performing a joint channel estimation based on the subset of PRGs when the subset of PRGs are associated with the same precoder.

24. The method of claim 23, further comprising:

communicating with the network node based at least in part on a result of the joint channel estimation.

25. The method of claim 23, wherein the signaling comprises an indication of a quantity of PRGs that are in the subset of PRGs.

26. A method of wireless communication performed by a network node, comprising:

receiving a reference signal from a user equipment (UE);

transmitting, to the UE and in response to receiving the reference signal, signaling indicating a likelihood of a set of physical resource block groups (PRGs) comprising a subset of PRGs that are associated with a same precoder, wherein the subset of PRGs comprises a plurality of PRGs that span contiguous frequency resources, and wherein the subset of PRGs being associated with the same precoder enables the UE to perform a joint channel estimation; and transmitting, to the UE, a transmission via the set of PRGs.

* * * * *